United States Patent
Huff

(10) Patent No.: US 10,586,961 B2
(45) Date of Patent: Mar. 10, 2020

(54) MULTI-MODULAR BATTERY SYSTEM

(71) Applicant: Artisan Vehicle Systems Inc., Camarillo, CA (US)

(72) Inventor: Brian R. Huff, Newbury Park, CA (US)

(73) Assignee: Artisan Vehicle Systems Inc., Camarillo, CA (US)

( * ) Notice: Subject to any disclaimer, the term of this patent is extended or adjusted under 35 U.S.C. 154(b) by 99 days.

(21) Appl. No.: 15/988,843

(22) Filed: May 24, 2018

(65) Prior Publication Data

US 2018/0351144 A1 Dec. 6, 2018

Related U.S. Application Data

(60) Provisional application No. 62/512,296, filed on May 30, 2017.

(51) Int. Cl.
| | |
|---|---|
| *H01M 2/10* | (2006.01) |
| *H01M 2/20* | (2006.01) |
| *H01M 2/30* | (2006.01) |
| *H01M 10/42* | (2006.01) |
| *H01M 10/48* | (2006.01) |

(52) U.S. Cl.
CPC ......... *H01M 2/1077* (2013.01); *H01M 2/206* (2013.01); *H01M 2/305* (2013.01); *H01M 10/425* (2013.01); *H01M 10/4207* (2013.01); *H01M 10/48* (2013.01); *H01M 2010/4271* (2013.01); *H01M 2010/4278* (2013.01); *H01M 2220/20* (2013.01)

(58) Field of Classification Search
CPC .... H01M 2/1077; H01M 10/48; H01M 2/206; H01M 2/305; H01M 10/4207; H01M 10/425

See application file for complete search history.

(56) References Cited

U.S. PATENT DOCUMENTS

| | | | |
|---|---|---|---|
| 2003/0059676 A1* | 3/2003 | Ruiz Rodriguez . | H01M 2/0242 429/164 |
| 2012/0288744 A1* | 11/2012 | Guen ..................... | H01M 2/206 429/158 |
| 2013/0344378 A1* | 12/2013 | Kohara ............... | H01M 2/1016 429/158 |
| 2016/0344011 A1* | 11/2016 | Ogawa ................ | H01M 2/1077 |

* cited by examiner

*Primary Examiner* — Stewart A Fraser
(74) *Attorney, Agent, or Firm* — Plumsea Law Group, LLC

(57) ABSTRACT

A battery module having a plurality of battery cells is described. The battery module includes a head unit with corresponding conical positive and negative terminals that allow additional battery modules to mate together and be electrically coupled in an end-to-end relationship. A plurality of battery modules can be combined together into rows of modules that are the electrically coupled to form a multi-modular battery system. The multi-modular battery system uses interchangeable individual battery modules for ease of replacement. Battery modules of a multi-modular battery system can communicate with each other using optical communication methods, including via line-of-sight and/or optical cables.

29 Claims, 21 Drawing Sheets

MULTI-MODULAR BATTERY SYSTEM

CROSS-REFERENCE TO RELATED APPLICATION

This application claims the benefit under 35 U.S.C. 119(e) to provisional application Ser. No. 62/512,296 titled "Multi-Modular Battery System" and filed May 30, 2017, which is hereby incorporated by reference in its entirety.

BACKGROUND OF THE INVENTION

1. Field of the Invention

The present invention relates generally to a multi-modular battery system (e.g., a battery pack). Specifically, a multi-modular battery system that is scalable and reconfigurable. In particular, the present disclosure relates to a multi-modular battery system used in heavy duty electric vehicles used in mining operations.

2. Description of Related Art

Large, high voltage batteries are used in heavy duty applications, such as in electric and hybrid vehicles used in underground mining. These batteries often include multiple battery modules each containing a set of individual battery cells. A description of this type of battery module system is provided in co-pending U.S. patent application Ser. No. 14/494,133, which is hereby incorporated in its entirety. A description of a battery module maintenance system is provided in co-pending U.S. patent application Ser. No. 14/721,726, which is also hereby incorporated in its entirety. A description of the subsurface mining environment is provided in co-pending U.S. patent application Ser. No. 15/133,478, which is also hereby incorporated in its entirety.

Because of the inconsistent temperatures and rough conditions in which these batteries are used, these battery cells often begin to weaken at different rates. The weaker battery cells within a battery module tend to leak charge quicker than other batteries in the same battery module. This leaking causes the individual battery cells within a battery module to have varying charges. The types of batteries used in heavy duty applications are prone to inefficiency, overheating, and/or other issues when the individual battery cells within a battery module have different charges. A description of a battery management system with a bi-directional balancing circuit is provided in co-pending U.S. Provisional Patent Application No. 62/398,857, and U.S. patent application Ser. No. 15/712,110, which are also hereby incorporated in its entirety.

There is a need in the art for a battery system and method that addresses the shortcomings of the prior art discussed above.

SUMMARY OF THE INVENTION

In one aspect, the invention provides a battery module including a plurality of battery cells. The battery module also includes a positive terminal coupler connecting positive terminal posts of the plurality of battery cells and a negative terminal coupler connecting negative terminal posts of the plurality of battery cells. The positive terminal coupler can include a conical positive terminal disposed on a front side of the battery module. The negative terminal coupler can include a conical negative terminal disposed on a rear side of the battery module.

In another aspect, the invention provides a multi-modular battery system. The multi-modular battery system includes a plurality of battery modules. Each battery module of the plurality of battery modules can include a plurality of battery cells, a positive terminal coupler connecting positive terminal posts of the plurality of battery cells, and a negative terminal coupler connecting negative terminal posts of the plurality of battery cells. The positive terminal coupler can include a conical positive terminal disposed on a front side of the battery module. The negative terminal coupler can include a conical negative terminal disposed on a rear side of the battery module. At least two battery modules of the plurality of battery modules can be coupled together in an end-to-end relationship by mating a conical positive terminal of one battery module with a conical negative terminal of another battery module.

In another aspect, the invention provides a method of replacing a battery module in a multi-modular battery system. The method includes providing a multi-modular battery system having a plurality of battery modules, wherein at least two battery modules of the plurality of battery modules are coupled together in an end-to-end relationship by mating a conical positive terminal of one battery module with a conical negative terminal of another battery module. The method also includes removing a battery module from the plurality of battery modules by uncoupling the conical negative terminal of the battery module from a conical positive terminal of an adjacent battery module.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

FIGS. 1 through 23 illustrate embodiments of a modular battery system that may be used in heavy duty applications, such as in electric and hybrid vehicles used in underground mining. However, other applications and uses for such a modular battery system would be apparent to those skilled in the art.

Figure 1:
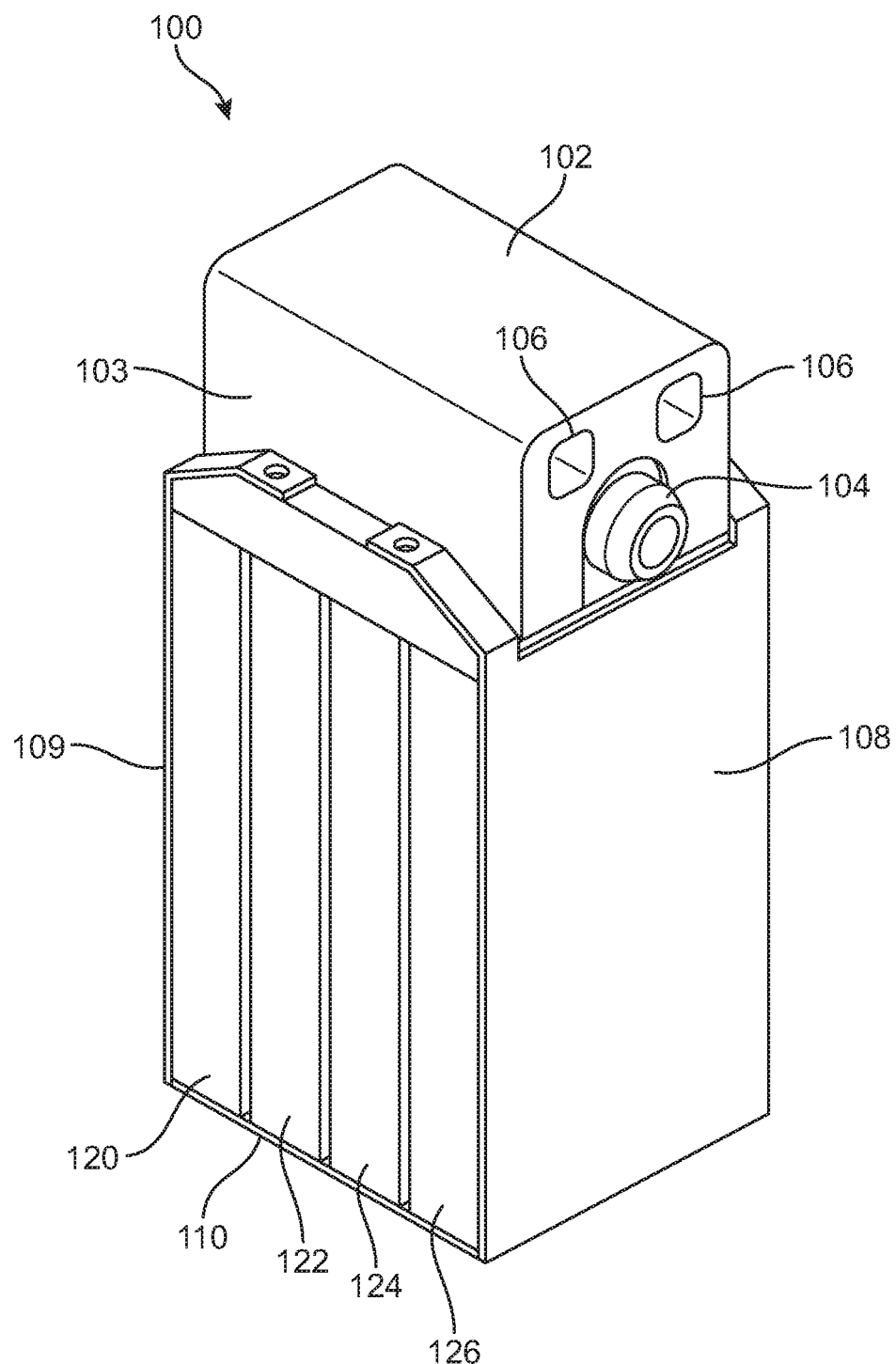
FIG. 1 is an isometric front view of an exemplary embodiment of a battery module.
Figure 2:
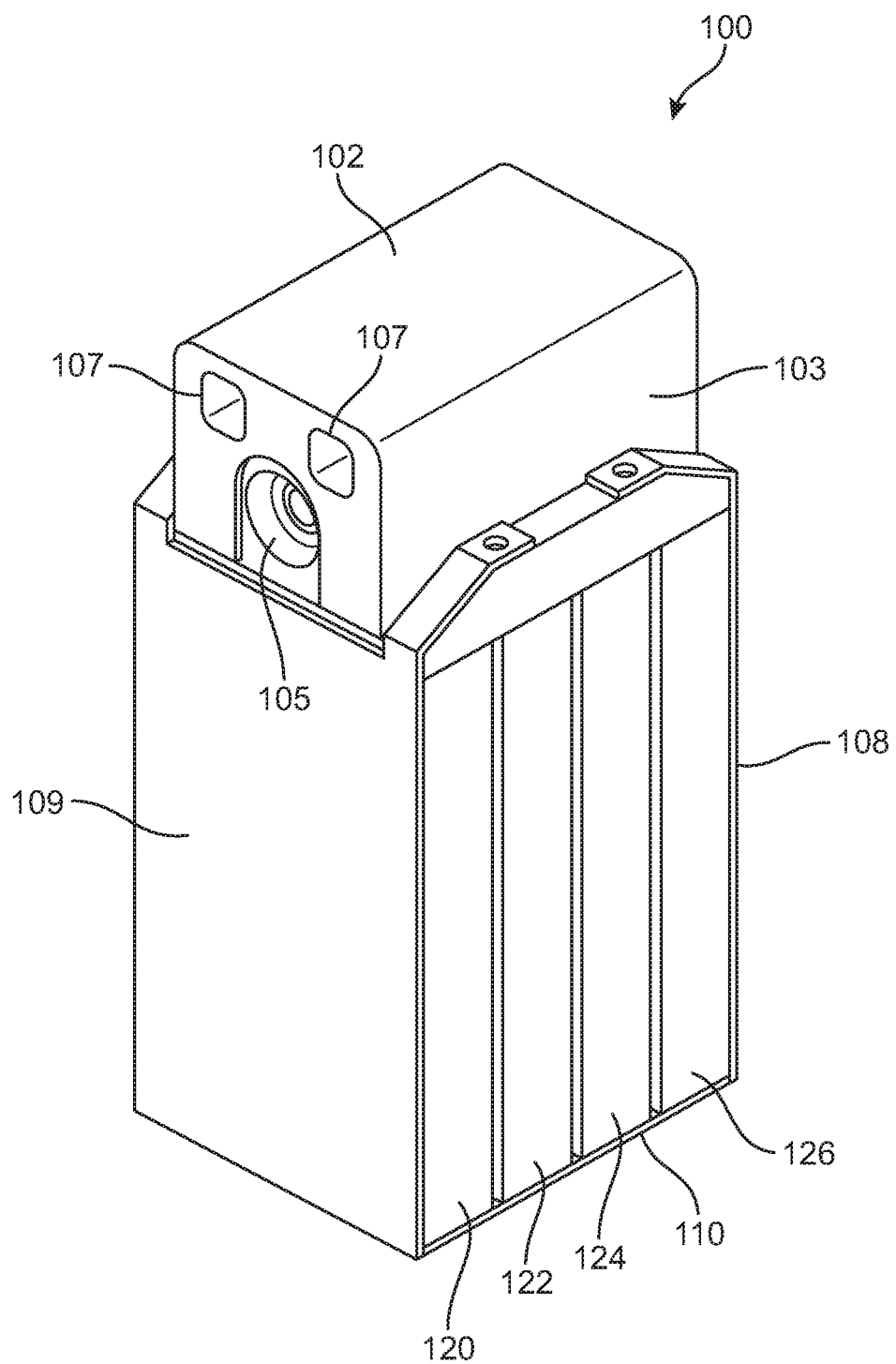
FIG. 2 is an isometric rear view of an exemplary embodiment of a battery module.

FIG. 1 illustrates an exemplary embodiment of a battery module 100. Battery module 100 includes a plurality of battery cells. In this embodiment, the plurality of battery cells in battery module 100 includes 4 battery cells, which include the following: cell 120, cell 122, cell 124, and cell 126. Battery module 100 also includes a head unit 102. Head unit 102 can provide an enclosure that includes various components to connect and control the plurality of battery cells in battery module 100. In this embodiment, head unit 102 includes a conical positive front terminal 104 and a corresponding conical negative rear terminal 105 (shown in FIG. 2). Conical positive front terminal 104 has a generally convex shape that protrudes from head unit 102 on the front side of battery module 100 and includes an opening. Conical negative rear terminal 105 has a generally concave shape that recesses into head unit 102 on the rear side of battery module 100 and includes an opening of similar diameter as the opening in conical positive front terminal 104. In an exemplary embodiment, the conical convex shape of conical positive front terminal 104 corresponds to the conical concave shape of conical negative rear terminal 105. As will be described in more detail below, such corresponding shapes allow multiple battery modules to be coupled together in an end-to-end arrangement.

In this embodiment, head unit 102 also includes front optical ports 106 and rear optical ports 107 (shown in FIG. 2) that permit optical communication with a battery maintenance system (BMS) disposed within head unit 102. Front optical ports 106 and rear optical ports 107 are generally aligned along the same plane. As will be described in more detail below, this arrangement allows multiple battery modules that have been coupled together in an end-to-end arrangement to have aligned front optical ports and rear optical ports to facilitate optical communication between the battery maintenance systems disposed in the head units of the various battery modules.

In some embodiments, battery module 100 may further include additional components configured to couple and secure the elements of battery module 100 together. For example, head unit 102 of battery module 100 may include a shroud 103 that covers and encloses the components of head unit 102 and that fits on top of the plurality of battery cells, including cell 120, cell 122, cell 124, and cell 126. Shroud 103 can include openings on the front and rear to accommodate and allow access to conical positive front terminal 104 and conical negative rear terminal 105. Battery module 100 can include a bottom plate 110 that is configured to support the plurality of battery cells, including cell 120, cell 122, cell 124, and cell 126. Battery module 110 may also include a front apron 108 and a rear apron 109 that attaches to bottom plate 110 and shroud 103 of head unit 102 to provide an enclosure or chassis for the plurality of battery cells. In this embodiment, shroud 103 includes shoulders disposed on opposite sides of battery module 100 that provide attachment points for the arms of front apron 108 and rear apron 109.

In various embodiments, battery module 100 may be configured to use any suitable number of battery cells. As used herein, a battery cell may use any suitable battery technology. Examples of a battery cell include capacitors, ultra-capacitors, and electrochemical cells. Examples of electrochemical cells include primary (e.g., single use) and secondary (e.g., rechargeable). Examples of secondary electrochemical cells include lead-acid, valve regulated lead-acid (VRLA), gel, absorbed glass mat (AGM), nickel-cadmium (NiCd), nickel-zinc (NiZn), nickel metal hydride (NiMH), lithium-ion (Li-ion), and the like. A battery cell may have various voltage levels. For example, a battery cell of battery module 100 may have a voltage of less than 40 volts, less than 20 volts, less than 10 volts, less than 5 volts, 3.3 volts, less than 3.3 volts, and the like. Similarly, the battery cell may have various energy capacity levels. For example, a battery cell of battery module 100 may have a capacity of more than 13 ampere-hour, more than 10 ampere-hour, more than 20 ampere-hour, more than 25 ampere-hour, and the like.

Figure 3:
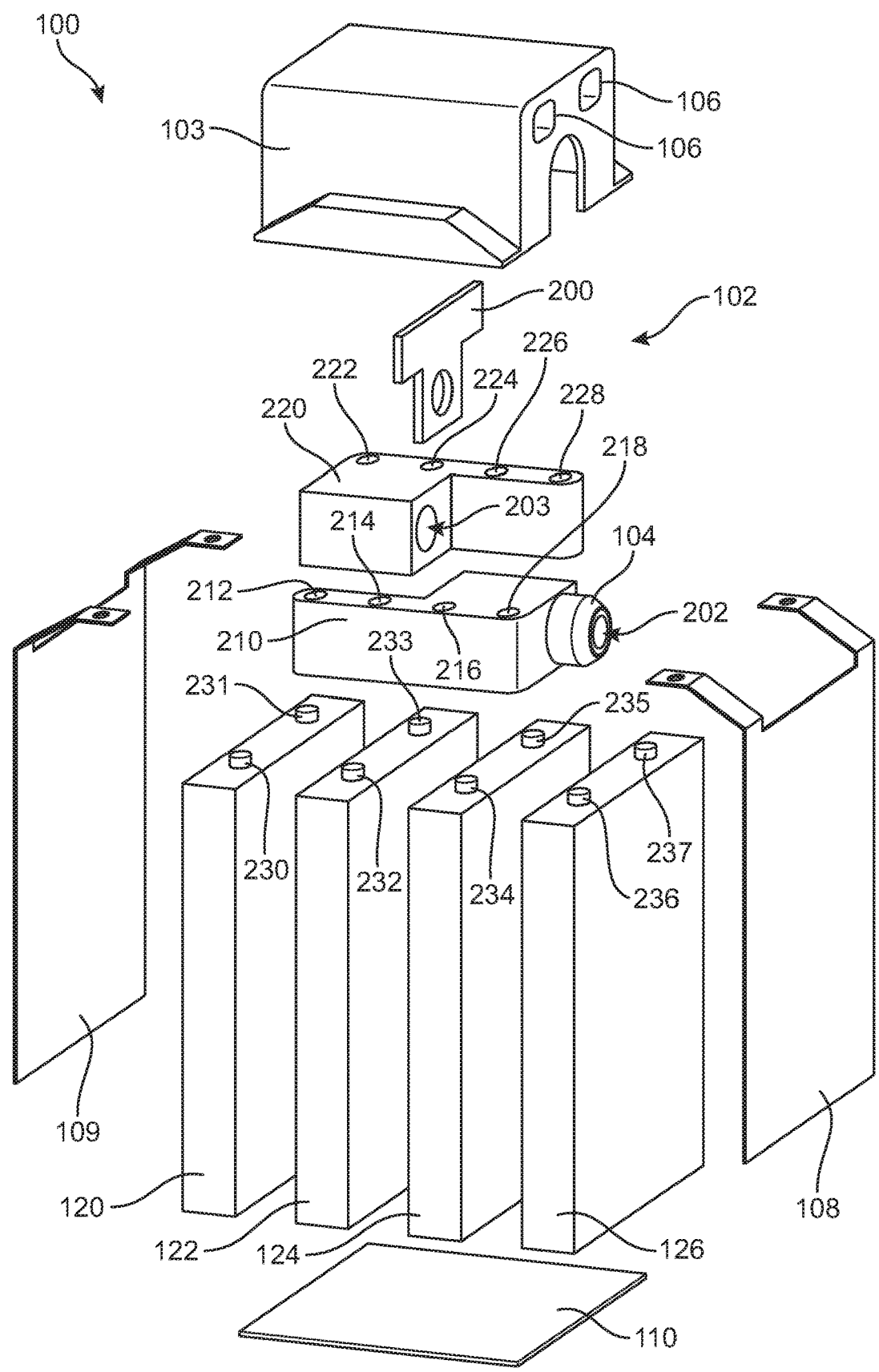
FIG. 3 is an exploded isometric view of an exemplary embodiment of a battery module.

Referring now to FIG. 3, an exploded view of battery module 100 is illustrated. In this embodiment, the components contained within head unit 102 can be seen in more detail. As previously discussed, head unit 102 can include a battery maintenance system (BMS) 200 that is located between a positive terminal coupler 210 and a negative terminal coupler 220. BMS 200 may use a linear chip as a bi-directional controller to transfer and/or redistribute charge between the plurality of cells, including cell 120, cell 122, cell 124, and cell 126. One suitable example of a battery maintenance system that can be used in battery module 100 is provided in co-pending U.S. Provisional Patent Application No. 62/398,857, and U.S. patent application Ser. No. 15/712,110, which are incorporated by reference above. With this arrangement, BMS 200 can provide load balancing for battery module 100.

In this embodiment, head unit 102 includes positive terminal coupler 210 and negative terminal coupler 220 that are configured to attach to and couple together the corresponding positive post terminals and negative post terminals of each of the individual cells of the plurality of battery cells, including cell 120, cell 122, cell 124, and cell 126. In this embodiment, cell 120 includes first positive post 230 and first negative post 231, cell 122 includes second positive post 232 and second negative post 233, cell 124 includes third positive post 234 and third negative post 235, and cell 126 includes fourth positive post 236 and fourth negative post 237. Positive terminal coupler 210 includes a plurality of post recesses, including first recess 212, second recess 214, third recess 216, and fourth recess 218. Similarly, negative terminal coupler 220 includes a plurality of post recesses, including fifth recess 222, sixth recess 224, seventh recess 226, and eighth recess 228.

Positive terminal coupler 210 may receive first positive post 230 of cell 120 in first recess 212, second positive post 232 of cell 122 in second recess 214, third positive post 234 of cell 124 in third recess 216, and fourth positive post 236 of cell 126 in fourth recess 218. Similarly, negative terminal coupler 220 may receive first negative post 231 of cell 120 in fifth recess 222, second negative post 233 of cell 122 in sixth recess 224, third negative post 235 of cell 124 in seventh recess 226, and fourth negative post 237 of cell 126 in eighth recess 228. With this arrangement, positive terminal coupler 210 connects all of the positive posts of the plurality of battery cells together and negative terminal coupler 220 connects all of the negative posts of the plurality of battery cells together.

In this embodiment, positive terminal coupler 210 includes conical positive front terminal 104 that is electrically connected with all of the positive posts of the plurality of battery cells through the plurality of post recesses, including first recess 212, second recess 214, third recess 216, and fourth recess 218. Negative terminal coupler 220 includes conical negative rear terminal 105 that is electrically connected with all of the negative posts of the plurality of battery cells through the plurality of post recesses, including fifth recess 222, sixth recess 224, seventh recess 226, and eighth recess 228. Disposed between positive terminal coupler 210 and negative terminal coupler 220 is BMS 200. As described above, BMS 200 is configured with a bi-directional controller to transfer and/or redistribute charge between the plurality of cells, including cell 120, cell 122, cell 124, and cell 126.

In an exemplary embodiment, positive terminal coupler 210 and negative terminal coupler 220 may have similar shapes. For example, as shown in FIG. 3, positive terminal coupler 210 is approximately L-shaped, with a rectangular central body and an arm extending away from the central body at a right angle. In this embodiment, the plurality of post recesses are located along one edge of the central body and continue to extend along the arm. Negative terminal coupler 220 has a substantially similar L-shape as positive terminal coupler 210. Positive terminal coupler 210 and negative terminal coupler 220 as disposed in opposite relation to each other so that each arm extending away from the central body is disposed on opposite lateral sides and the back sides of each central body face towards each other.

In addition, the central body of each terminal coupler includes an opening that is disposed approximately in the middle of the terminal coupler and that extends all the way through from one side to the other. This opening provides a pathway for a coupling rod to electrically couple the positive and negative terminal couplers together. In this embodiment, positive terminal coupler 210 includes opening 202 disposed at the front of the central body and extending from conical positive front terminal 104 to the back side of the central body. Similarly, negative terminal coupler 220 includes an opening 203 that extends from conical negative rear terminal 105 to the back side of the central body. When positive terminal coupler 210 and negative terminal coupler 220 are placed onto battery module 100, the back side of negative terminal coupler 220 faces the back side of positive terminal coupler 210, with BMS 200 disposed between. With this arrangement, opening 202 and opening 203 are aligned with each other so as to provide a conduit or pathway extending through head unit 102 from conical positive front terminal 104 through to conical negative rear terminal 105.

Figure 4:
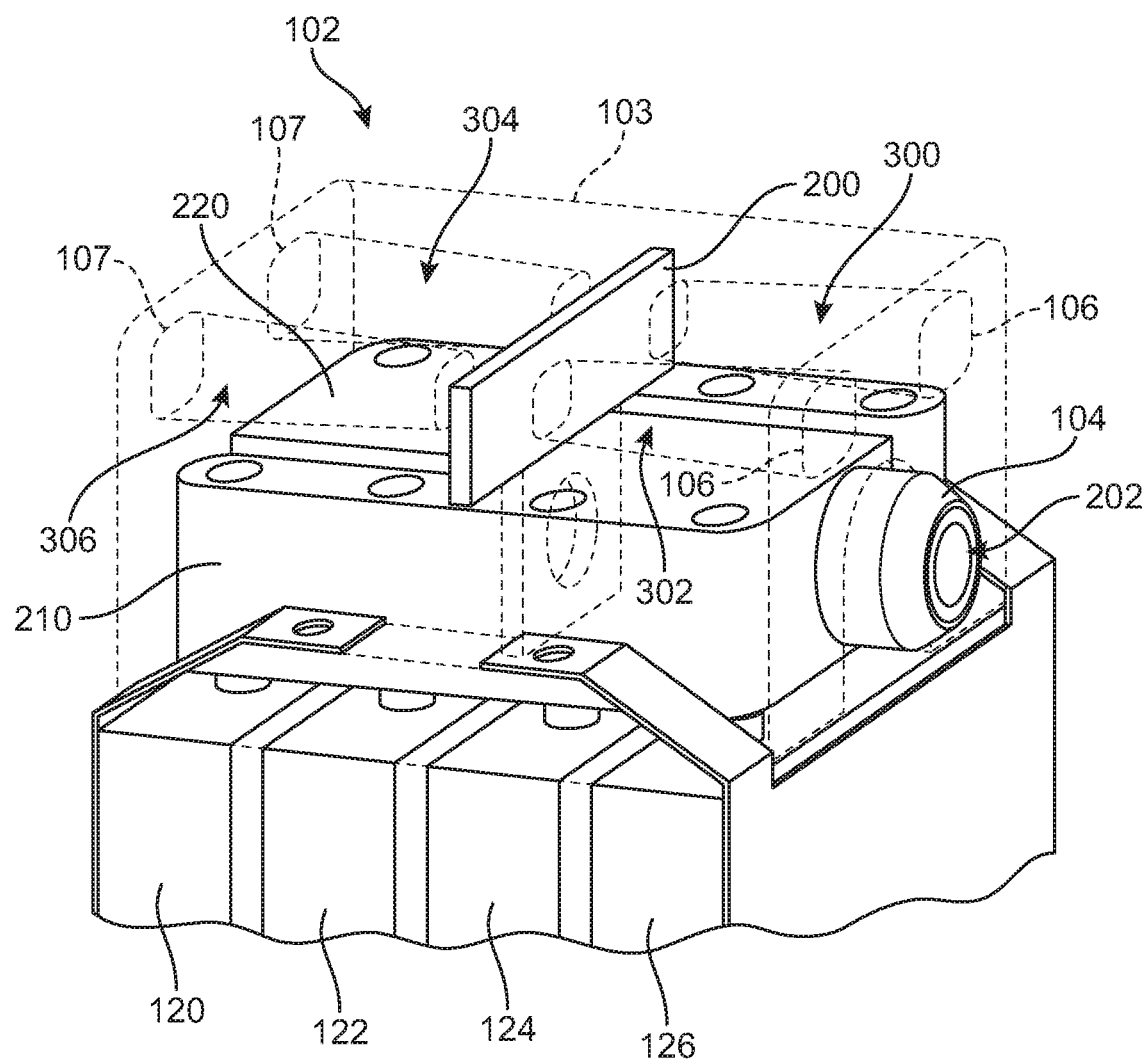
FIG. 4 is an enlarged view of a top portion of an exemplary embodiment of a battery module.

FIG. 4 illustrates an enlarged view of the top portion of battery module 100 with shroud 103 in outline to better show the components within head unit 102. In this embodiment, each of positive terminal coupler 210 and negative terminal coupler 220 includes an opening extending along its length with a similar diameter as the opening disposed in conical positive front terminal 104 and conical negative rear terminal 105. BMS 200 is disposed between positive terminal coupler 210 and negative terminal coupler 220 and is configured to control battery module 100.

In some embodiments, BMS 200 is configured for optical communication with other BMS units disposed in the other battery modules that form the multi-modular battery system. In an exemplary embodiment, BMS 200 is configured for line-of-sight optical communication with the other BMS units. Head unit 102 includes front optical ports 106 and rear optical ports 107 that permit optical communication between BMS 200 and other BMS units from the other battery modules. In this embodiment, front optical ports 106 include a first tapered recess 300 and a second tapered recess 302 that extend through the front of head unit 102 to BMS 200. Similarly, rear optical ports 107 include a third tapered recess 304 and a fourth tapered recess 306 that extend through the rear of head unit 102 to BMS 200. Each of first tapered recess 300, second tapered recess 302, third tapered recess 304, and fourth tapered recess 306 terminates at a location on BMS 200 where an optical module is located that is configured to transmit and receive optical line-of-sight communications with other BMS units on other battery modules. With this arrangement, first tapered recess 300 and second tapered recess 302 provide a pathway through the front of head unit 102 from front optical ports 106 to BMS 200 and third tapered recess 304 and fourth tapered recess 306 provide a pathway through the rear of head unit 102 from rear optical ports 107 to BMS 200 to allow optical line-of-sight communication.

Figure 5:
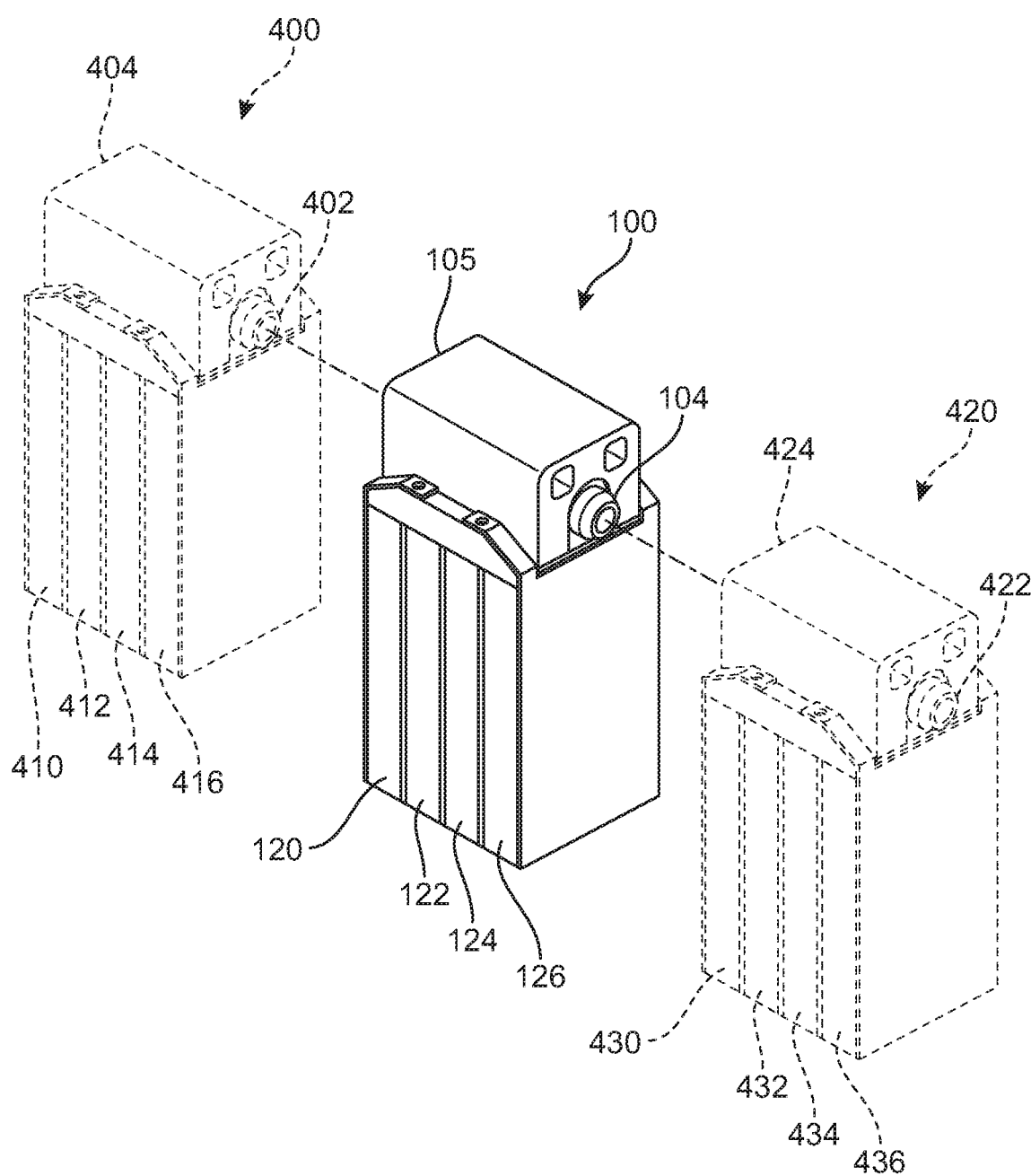
FIG. 5 is a representative view of coupling multiple battery modules together.

In exemplary embodiments, multiple individual battery modules may be coupled together to form a multi-modular battery system. Each battery module may be attached end-to-end by mating a conical positive front terminal with a corresponding conical negative rear terminal. Referring now to FIG. 5, an exemplary embodiment of mating battery module 100 with additional battery modules to form a multi-modular battery system is illustrated. In this embodiment, a second battery module 400 may be coupled at the rear of battery module 100 and a third battery module 420 may be coupled at the front of battery module 100.

Second battery module 400 and third battery module 420 may be substantially similar to battery module 100. Providing multiple battery modules that are substantially similar to each other allows for interchangeability between individual battery modules and provides a known capacity for a multi-modular battery system containing a given number of battery modules. In this embodiment, second battery module 400 includes a plurality of battery cells, including cell 410, cell 412, cell 414, and cell 416. Third battery module 420 also includes a plurality of battery cells, including cell 430, cell 432, cell 434, and cell 436. Each battery module includes conical positive and negative terminals with corresponding shapes to assist with mating and coupling together multiple battery modules in an end-to-end relationship. In this embodiment, second battery module 400 includes a conical positive front terminal 402 and a conical negative rear terminal 404 that are substantially similar to conical positive front terminal 104 and conical negative rear terminal 105, described above. Similarly, third battery module 420 also includes a conical positive front terminal 422 and a conical negative rear terminal 424 that are substantially similar to conical positive front terminal 104 and conical negative rear terminal 105 of battery module 100.

As shown in FIG. 5, multiple battery modules can be coupled together in an end-to-end relationship by mating respective conical positive front terminals and conical negative rear terminals. For example, in this embodiment, conical positive front terminal 402 that extends outward from the front of second battery module 400 is mated with the corresponding recess of conical negative rear terminal 105 at the rear of battery module 100 to couple second battery module 400 and battery module 100. Similarly, conical positive front terminal 104 that extends outward from the front of battery module 100 is mated with the corresponding recess of conical negative rear terminal 424 at the rear of third battery module 420 to couple battery module 100 and third battery module 420. By adding two additional battery modules (e.g., second battery module 400 and third battery module 420) to battery module 100, the combined multi-modular battery system formed has a greater combined capacity, in this case, a total of 12 cells.

With this arrangement, a plurality of substantially similar battery modules are interchangeable with each other and can be added together to provide a desired capacity or output requirements for a multi-modular battery system. A coupling rod (shown in FIG. 6) is inserted through conical positive front terminals and conical negative rear terminals of all of the coupled multiple battery modules to electrically connect each individual battery module together into a single multi-modular battery system.

Additionally, the corresponding shapes of the concave conical positive terminal and convex conical negative terminal assist with placement and fitment of the multiple battery modules with each other in a blind or limited visibility environment, such as found in underground mining environments. As will also be described in more detail below, the coupling rod that extends through conical positive front terminals and conical negative rear terminals of all of the coupled multiple battery modules further assists with providing a simplified mechanism for coupling the battery modules in these environments.

Figure 6:
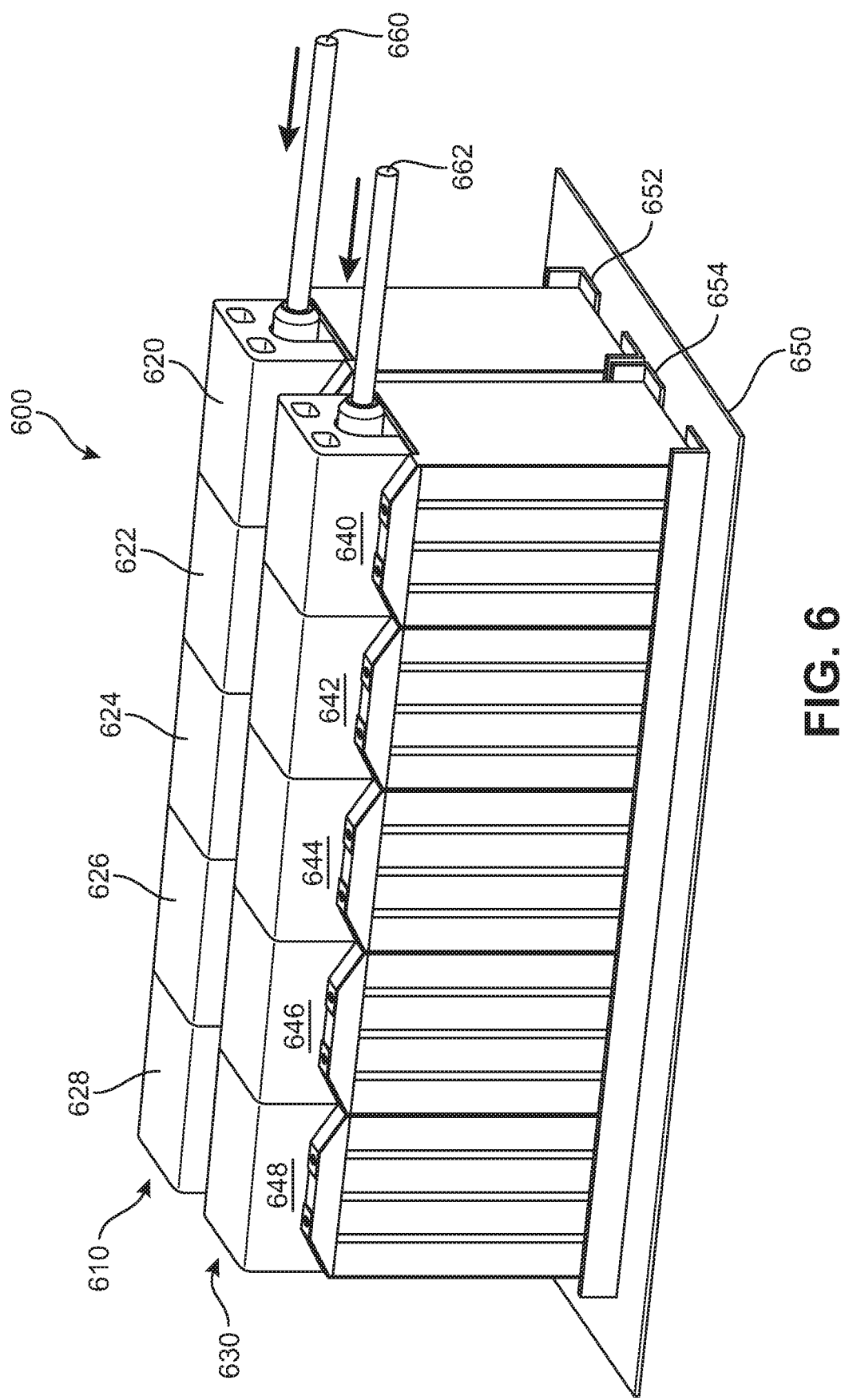
FIG. 6 is a schematic view of an exemplary embodiment of a multi-modular battery system being coupled together using a coupling rod.

In some embodiments, any number of individual battery modules may be connected together to form a multi-modular battery system. For example, the electrical capacity and/or physical size requirements of a given machine or situation may determine the number of battery modules in a multi-modular battery system. In an exemplary embodiment, a multi-modular battery system 600 may include ten battery modules arranged in two rows of five battery modules, as shown in FIG. 6. A first row 610 of five battery modules includes a first battery module 620, a second battery module 622, a third battery module 624, a fourth battery module 626, and a fifth battery module 628. A second row 630 of five battery modules includes a sixth battery module 640, a seventh battery module 642, an eighth battery module 644, a ninth battery module 646, and a tenth battery module 648.

In this embodiment, first row of modules 610 and second row of modules 630 are disposed in an approximately parallel relationship to form a grid of two rows of five battery modules. While in the present embodiments, multi-modular battery system 600 is separated into two rows of five battery modules, other configurations with varying numbers of rows and/or varying numbers of battery modules in each row can be provided according to the desired electrical capacity and/or physical size requirements of a given machine or situation. In this embodiment, each battery module includes 4 cells to provide a total of 40 cells to the multi-modular battery system 600. Each of the battery modules of multi-modular battery system 600 may be substantially similar to battery module 100, described above. In other embodiments, a greater or smaller number of battery modules may be provided to form a multi-modular battery system with more or less total numbers of cells.

Multi-modular battery system 600 may be provided in different environments and platforms. In some cases, multi-modular battery system 600 may be part of a vehicle, for example, a heavy duty electric vehicle, that is configured to move. In other cases, multi-modular battery system 600 may be configured to be substantially stationary. In different embodiments, multi-modular battery system 600 may include various platforms and/or support structures configured for its various environments and uses. In the present embodiments, a platform 650 is provided to support multi-modular battery system 600. Platform 650 may include additional components that are configured to assist with arranging the various battery modules forming multi-modular battery system 600. For example, each row of battery modules can include a corresponding track system that allows the battery modules to slide into and out of engagement with the other battery modules in its respective row.

In this embodiment, first row of modules 610 is associated with a first track system 652 extending along a length of first row 610 and configured to receive first battery module 620, second battery module 622, third battery module 624, fourth battery module 626, and fifth battery module 628. Similarly, second row of modules 630 is associated with a second track system 654 extending along a length of second row 630 and configured to receive sixth battery module 640, seventh battery module 642, eighth battery module 644, ninth battery module 646, and tenth battery module 648. First track system 652 and second track system 654 provide a mechanism to allow sliding each battery module into place to couple with the previous battery module. In this embodiment, first track system 652 and second track system 654 are generally parallel to each other to place the two rows of battery modules in a similar parallel relationship. It should be understood that other configurations of track systems can be provided to suit a particular vehicle, environment, or situation.

In an exemplary embodiment, a coupling rod can be inserted through conical positive front terminals and conical negative rear terminals of the coupled multiple battery modules to electrically connect each individual battery module together into a single multi-modular battery system. For example, as shown in FIG. 6, a first coupling rod 660 is inserted through conical positive front terminals and conical negative rear terminals of all of the coupled battery modules of first row 610, including first battery module 620, second battery module 622, third battery module 624, fourth battery module 626, and fifth battery module 628. Once fully inserted, first coupling rod 660 will extend from the conical positive front terminal at the front of first battery module 620 to the conical negative rear terminal at the rear of fifth battery module 628 at the end of first row 610 to electrically couple all of first battery module 620, second battery module 622, third battery module 624, fourth battery module 626, and fifth battery module 628 together.

A second coupling rod 662 is inserted through conical positive front terminals and conical negative rear terminals of all of the coupled battery modules of second row 630, including sixth battery module 640, seventh battery module 642, eighth battery module 644, ninth battery module 646, and tenth battery module 648. Once fully inserted, second coupling rod 662 will extend from the conical positive front terminal at the front of sixth battery module 640 to the conical negative rear terminal at the rear of fifth battery module 648 at the end of second row 630 to electrically couple all of sixth battery module 640, seventh battery module 642, eighth battery module 644, ninth battery module 646, and tenth battery module 648 together.

First coupling rod 660 and second coupling rod 662 have an outside diameter that approximately corresponds with an inside diameter of the openings in conical positive front terminals and conical negative rear terminals of the coupled battery modules so that first coupling rod 660 and second coupling rod 662 may slide through the openings during insertion and/or removal. In some embodiments, first coupling rod 660 and second coupling rod 662 may be tightened or fastened once in place to secure first coupling rod 660 and second coupling rod 662 within the battery modules. For example, a nut may be attached to one end of first coupling rod 660 and/or second coupling rod 662 to secure it in place.

Figure 7:
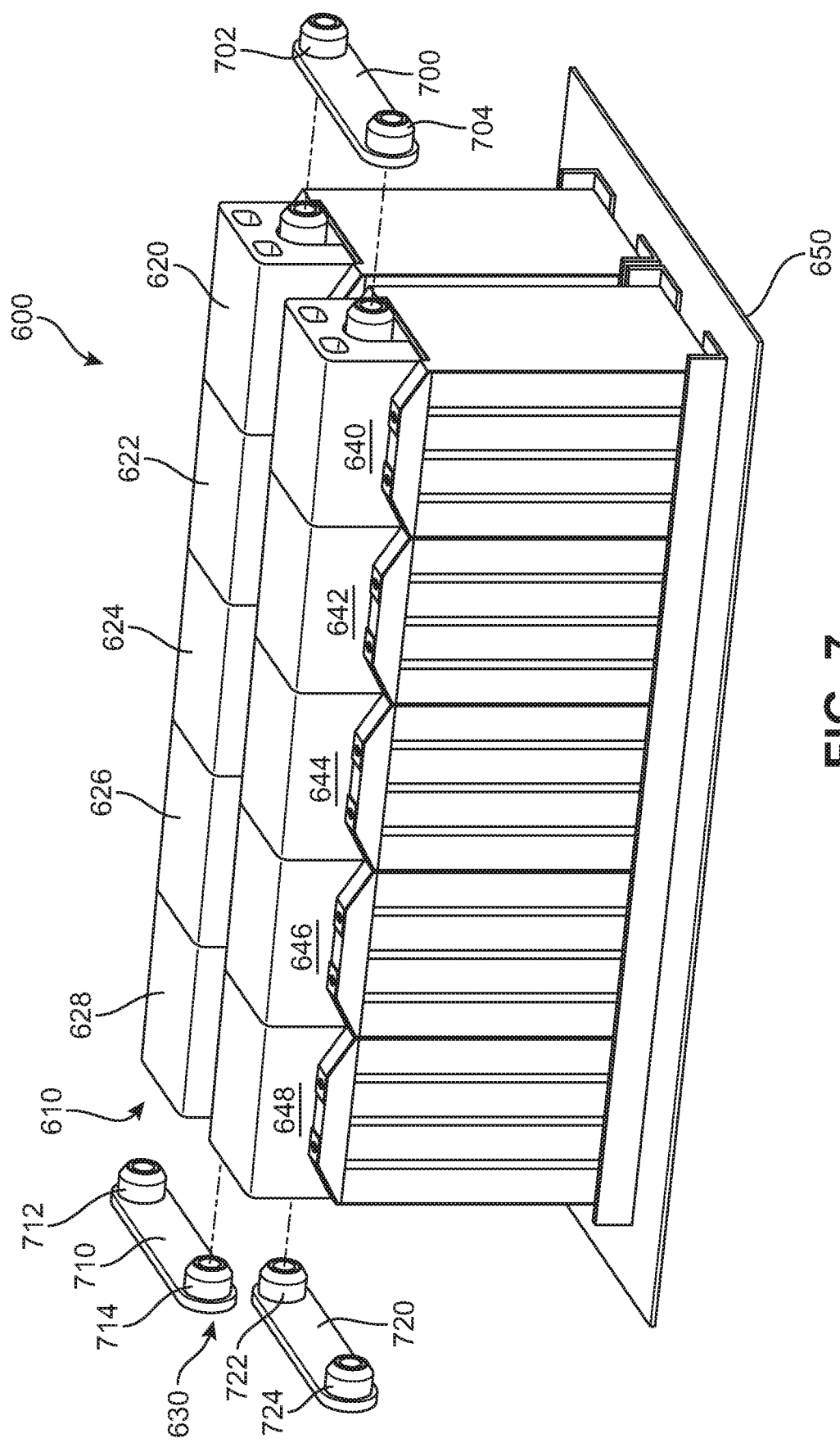
FIG. 7 is a schematic view of an exemplary embodiment of a multi-modular battery system being coupled together using bus bars.

Upon insertion of first coupling rod 660 and second coupling rod 662, the battery modules in each separate row, e.g., first row 610 and second row 630, will be coupled together in series. The two rows of battery modules may then be electrically coupled in parallel to form multi-modular battery system 600. Accordingly, as shown in FIG. 7, a set of bus bars may be used to electrically couple first row 610 and second row 630 together to form single multi-modular battery system 600. In this embodiment, a first bus bar 700 electrically couples the conical positive front terminal of first battery module 620 in first row 610 and the conical positive front terminal of sixth battery module 640 in second row 630. First bus bar 700 includes a first opening 702 and a second opening 704 that are configured to receive and surround the conical positive front terminals of the battery modules. First opening 702 fits over the conical positive front terminal of first battery module 620 in first row 610 and second opening 704 fits over the conical positive front terminal of sixth battery module 640 in second row 630 to electrically couple the positive terminals of first row of modules 610 and second row of modules 630.

A pair of bus bars can also be used to provide available connectors to electrically couple the negative terminals of first row of modules 610 and second row of modules 630. In this embodiment, a second bus bar 710 is electrically coupled to the conical negative rear terminal of fifth battery module 628 in first row 610. A third bus bar 720 is electrically coupled to the conical negative rear terminal of tenth battery module 648 in second row 630. Second bus bar 710 includes a first conical connector 712 that has a corresponding convex cone shape configured to mate with and fit into the concave conical recess in the conical negative rear terminal of fifth battery module 628. Second bus bar 710 also includes a second conical connector 714 that has a corresponding convex cone shape. Second conical connector 714 is available for a connection to electrically couple the negative terminals of first row of modules 610.

Figure 8:
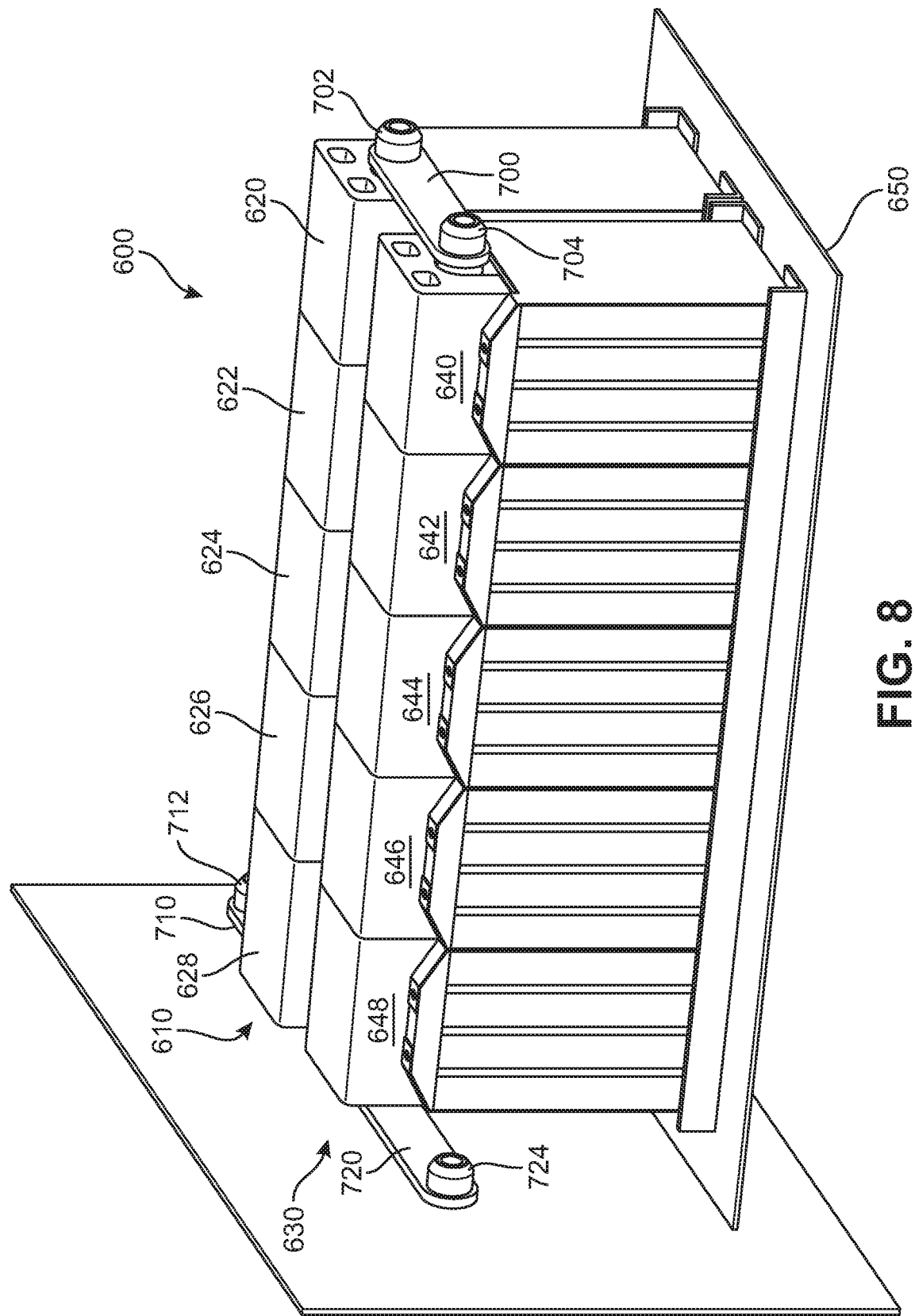
FIG. 8 is an isometric view of an exemplary embodiment of a multi-modular battery system including two rows of battery modules.

Third bus bar 720 is substantially similar to second bus bar 710. Third bus bar 720 includes a first conical connector 722 that has a corresponding convex cone shape configured to mate with and fit into the concave conical recess in the conical negative rear terminal of tenth battery module 648. Third bus bar 720 also includes a second conical connector 724 that has a corresponding convex cone shape. Second conical connector 724 is available for a connection to electrically couple the negative terminals of second row of modules 630. FIG. 8 illustrates multi-modular battery system 600 that is ready for use to provide electrical power. Multi-modular battery system 600 may be used by attaching appropriate connections to the conical positive front terminals connected by first bus bar 700 and second conical connector 714 of second bus bar 710 and second conical connector 724 of third bus bar 720.

Figure 9:
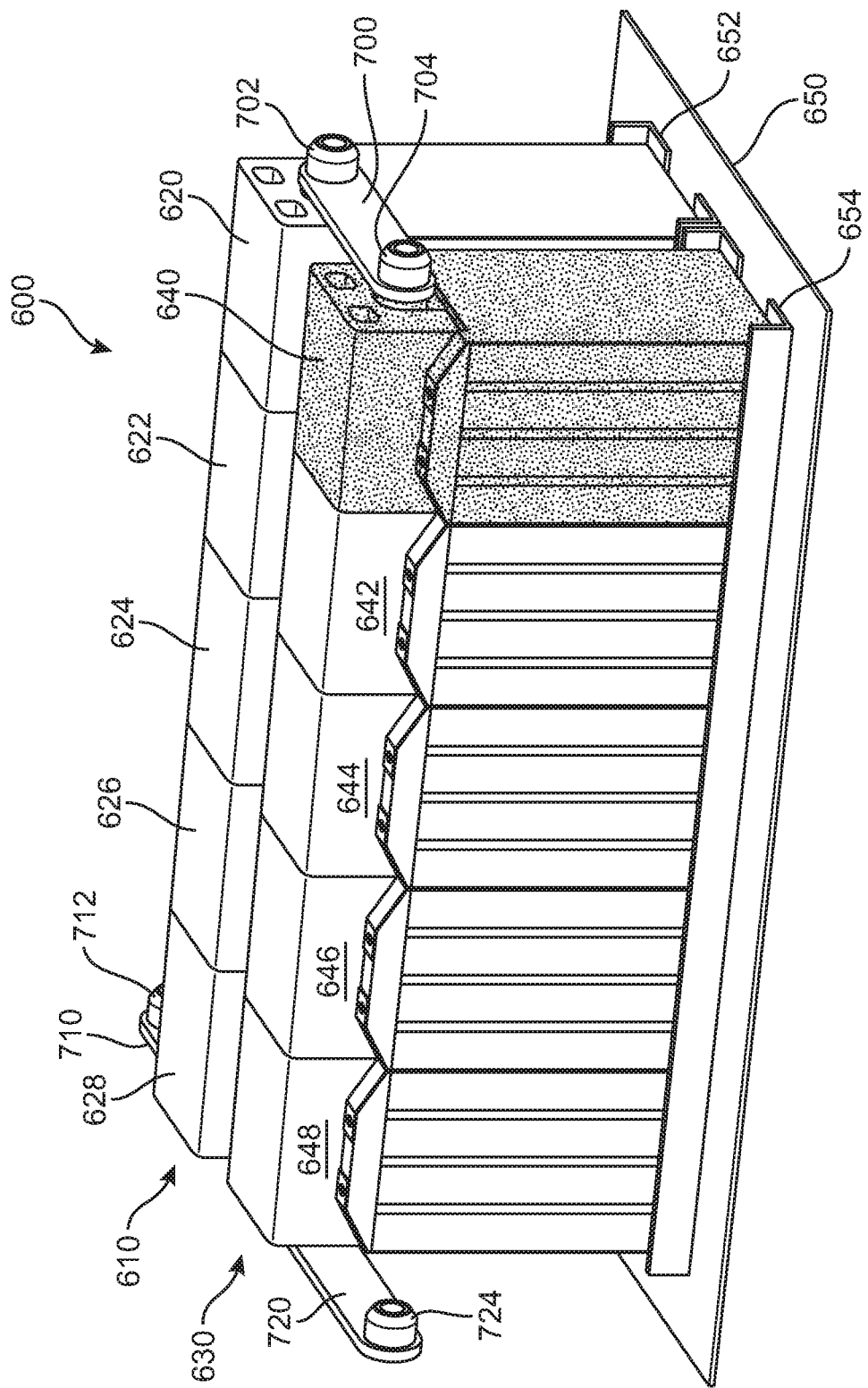
FIG. 9 is a schematic view of a faulty battery module in a multi-modular battery system.

In some cases, one or more individual battery modules within a multi-modular battery system may become faulty or inefficient and need replacement. The multi-modular battery system of the present embodiments allows for easy interchangeability and replacement of one or more faulty battery modules. Referring now to FIG. 9, multi-modular battery system 600 is illustrated. In this embodiment, one battery module in second row of modules 630 is determined to be faulty, inefficient, or otherwise in need of replacement. In this case, sixth battery module 640 (indicated with stippling in FIG. 9) is the identified faulty battery module that is to be replaced. This faulty battery module can be easily and simply replaced, as further described below.

Figure 10:
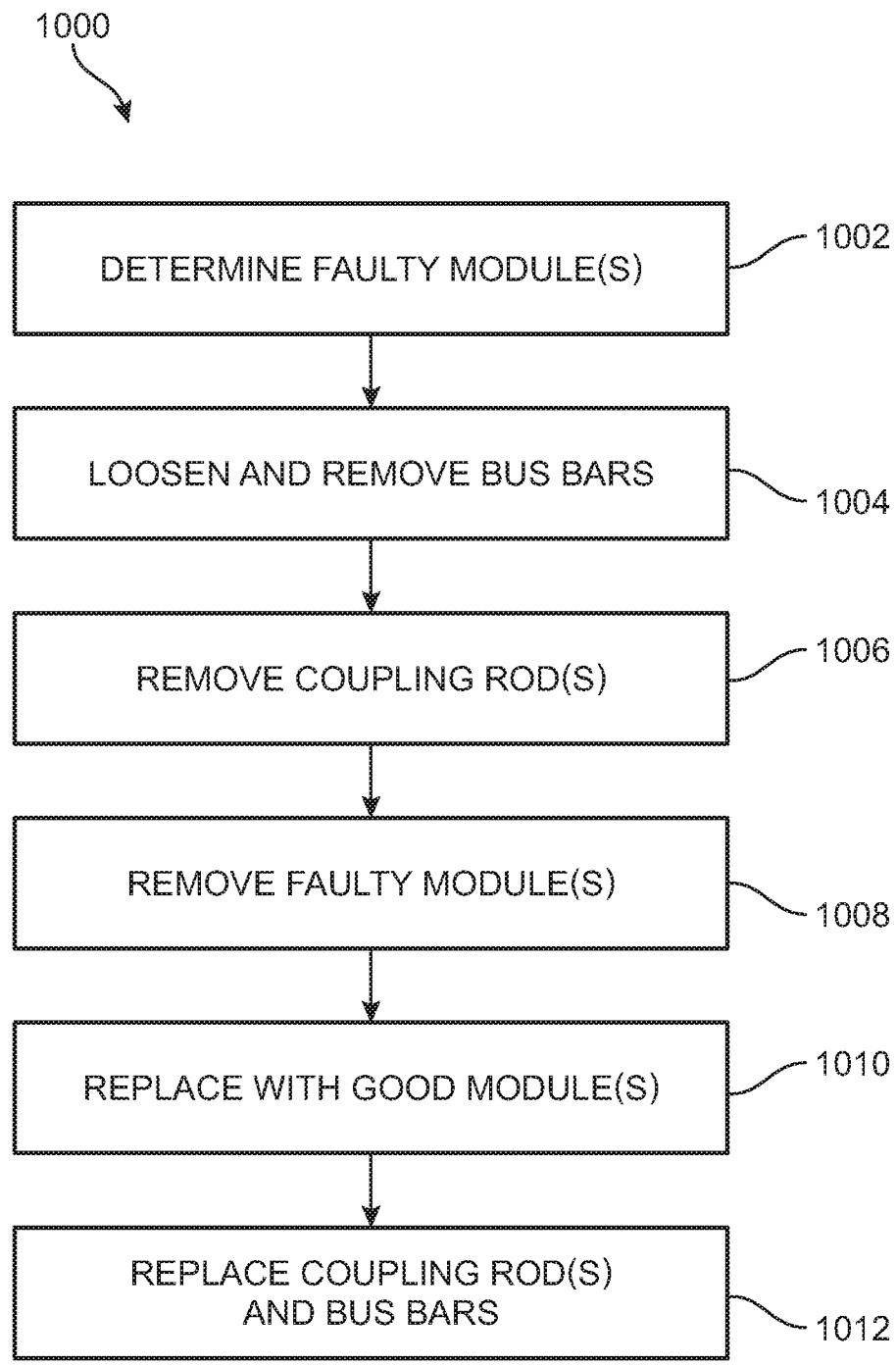
FIG. 10 is a flowchart of an exemplary process of replacing a faulty battery module in a multi-modular battery system.
Figure 11:
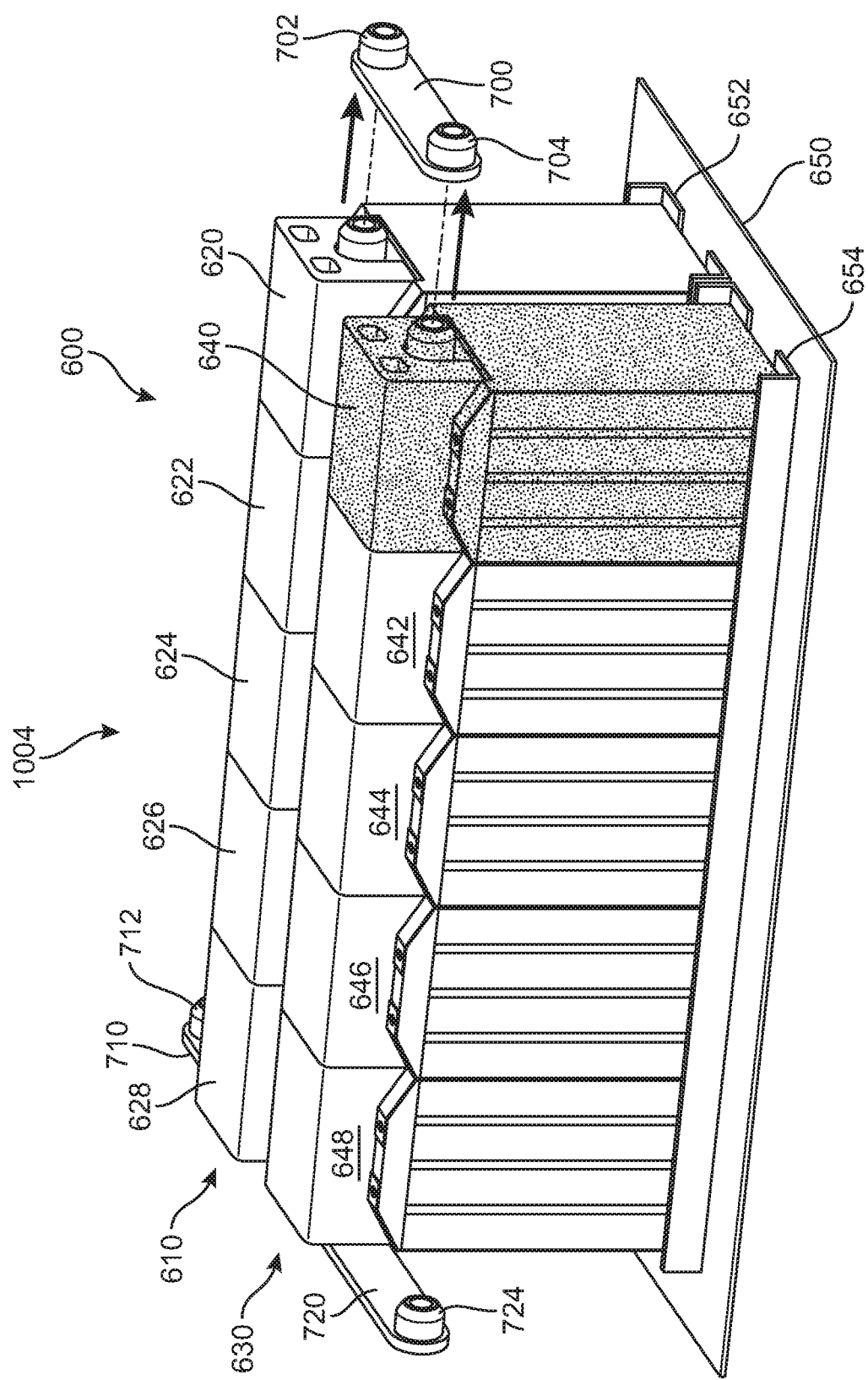
FIG. 11 is a representative view of a step of removing bus bars to replace a faulty battery module in a multi-modular battery system.

FIG. 10 illustrates a general flowchart of an exemplary process 1000 for replacing a faulty battery module in a multi-modular battery system according to the present embodiments. As shown in FIG. 10, at a first step 1002, a determination is made to identify one or more faulty battery modules or battery modules that are to be replaced. The determination made at step 1002 may be made, for example, by a BMS unit of an individual battery module or by a terminal that monitors and/or controls multi-modular battery system 600. Once the determination is made and the faulty battery module(s) is/are identified at step 1002, process 1000 proceeds to a second step 1004 where the bus bars connecting the positive terminals of the rows of battery modules are removed. Next, at a third step 1006, one or more coupling rods are removed to electrically uncouple the battery modules in the row or rows with the faulty battery module(s). At a fourth step 1008, the faulty battery module(s) are removed and are replaced with functioning, good battery modules at a fifth step 1010. Finally, at a sixth step 1012, the coupling rod(s) is/are reinserted and fastened and the bus bars are reattached so that the multi-modular battery system is ready for use.

Referring now to FIGS. 11 through 16, exemplary process 1000 for replacing a faulty battery module will be described with reference to multi-modular battery system 600, described above. In this embodiment, sixth battery module 640 in second row of modules 630 has been identified as the faulty battery module that is to be replaced. Accordingly, in FIG. 11, second step 1004 of removing bus bars connecting the positive and/or negative terminals is shown. In this embodiment, because sixth battery module 640 is located at the front of second row of modules 630, it may be easily accessed by removing only first bus bar 700 connecting the positive terminals of first row of modules 610 and second row of modules 630. In other embodiments, however, a faulty battery module may be more easily accessed from the rear, in which case, second bus bar 710 and/or third bus bar 720 may also, or alternatively, be removed to permit access to the faulty battery modules.

Figure 12:
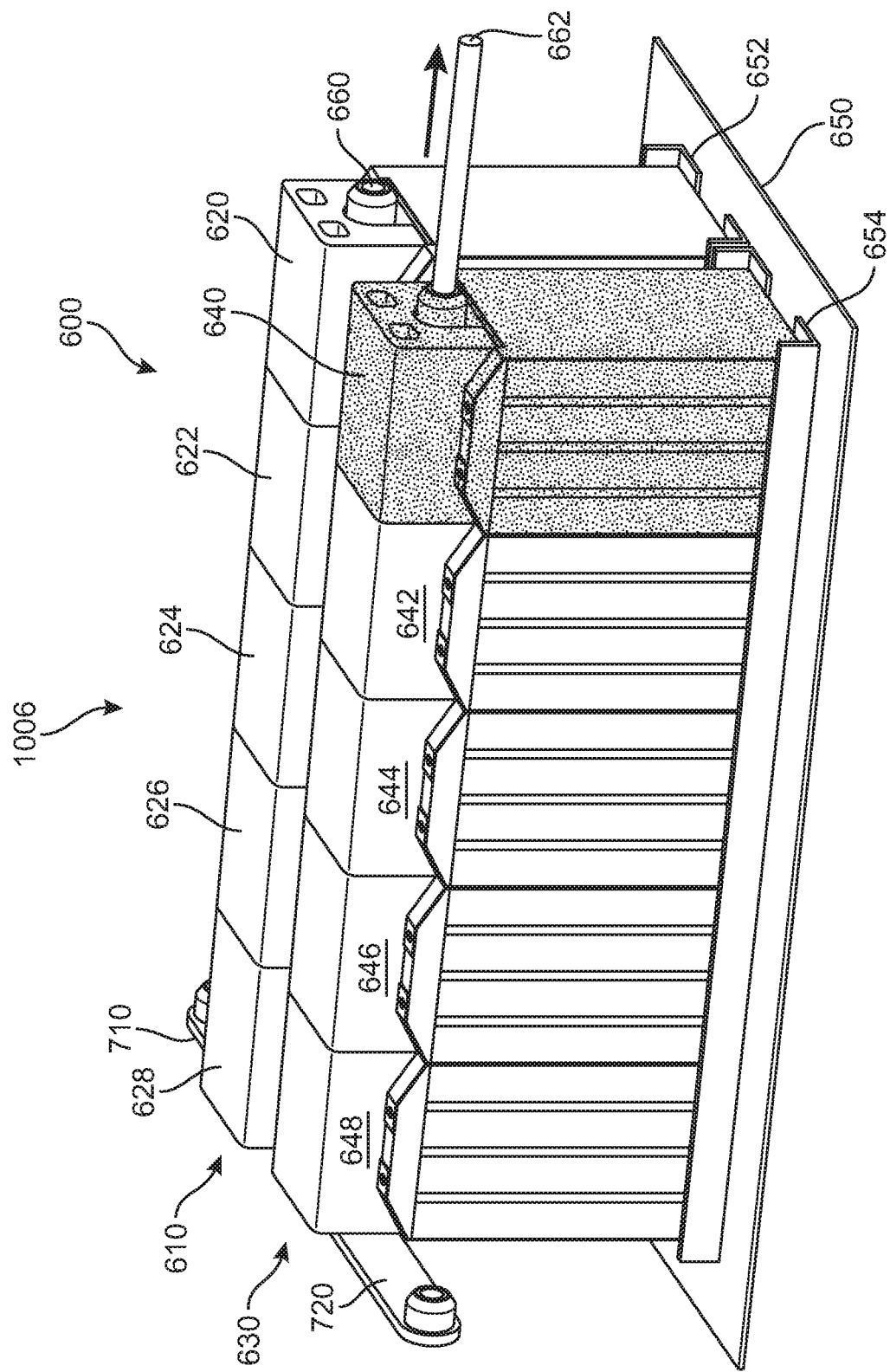
FIG. 12 is a representative view of a step of removing a coupling rod to replace a faulty battery module in a multi-modular battery system.

FIG. 12 illustrates third step 1006 of removing a coupling rod to electrically uncouple the battery modules in the row with the faulty battery module. In this embodiment, second coupling rod 662 is removed from the battery modules of second row of modules 630 so that faulty battery module 640 can be removed and replaced. Because none of the battery modules in first row of modules 610 need to be replaced in this example, first coupling rod 660 can remain in place. Accordingly, the configuration of multi-modular battery system 600 facilitates easier replacement of faulty battery modules by minimizing the amount of work and disassembly needed to replace individual battery modules.

Figure 13:
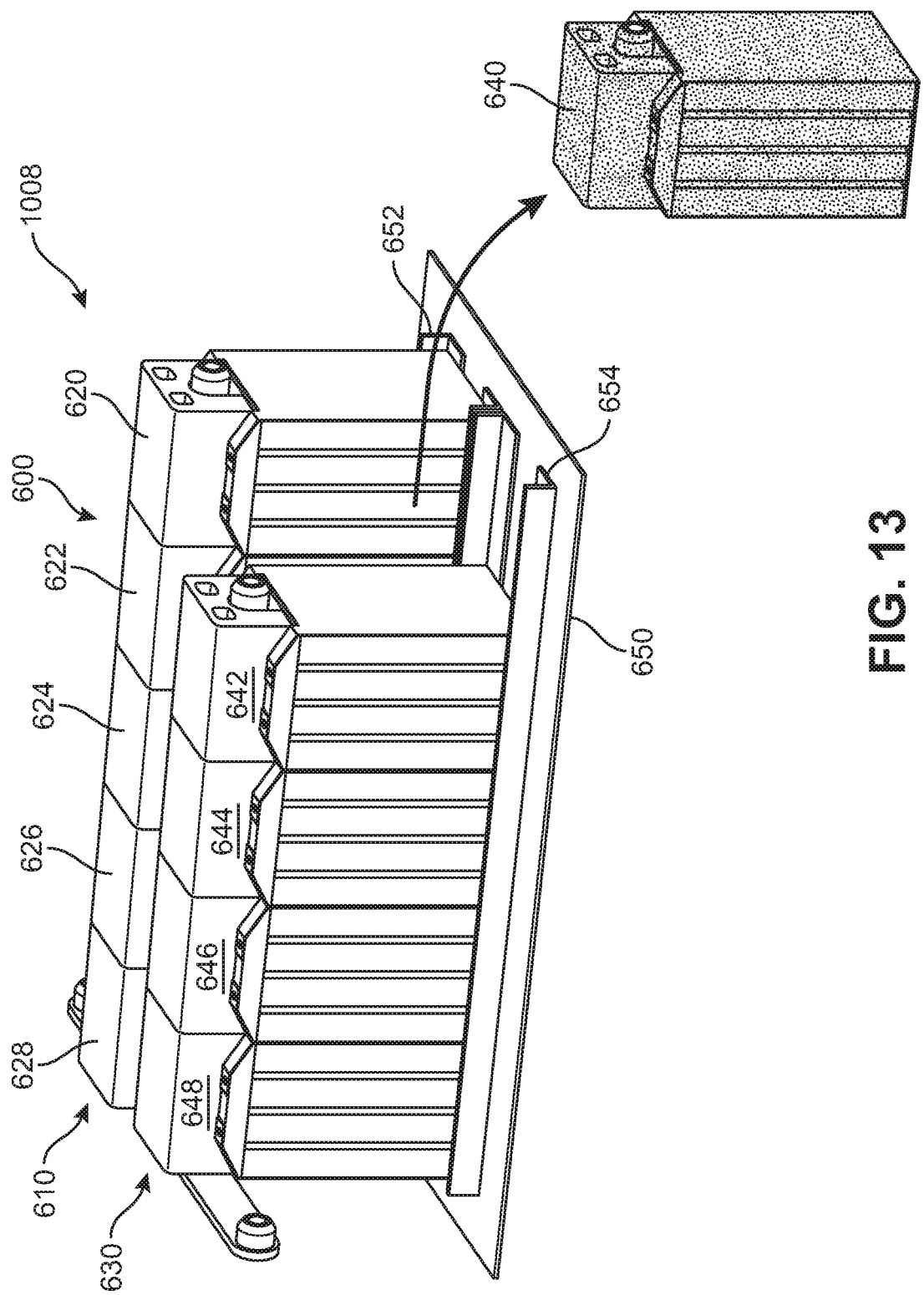
FIG. 13 is a representative view of a step of removing a faulty battery module in a multi-modular battery system.

Referring now to FIG. 13, fourth step 1008 of removing the faulty battery module is illustrated. In this embodiment, the faulty battery module, sixth battery module 640, is removed from second row of modules 630. As described above, to facilitate moving the battery modules, platform 650 may include tracks, including first track system 652 and second track system 654, that allow battery modules to be slid into and out of place in each row of modules. Accordingly, in FIG. 13, faulty battery module 640 can be removed from second row of modules 630 by sliding it along second track system 654 to separate it from seventh battery module 642 and move it off of platform 650.

Figure 14:
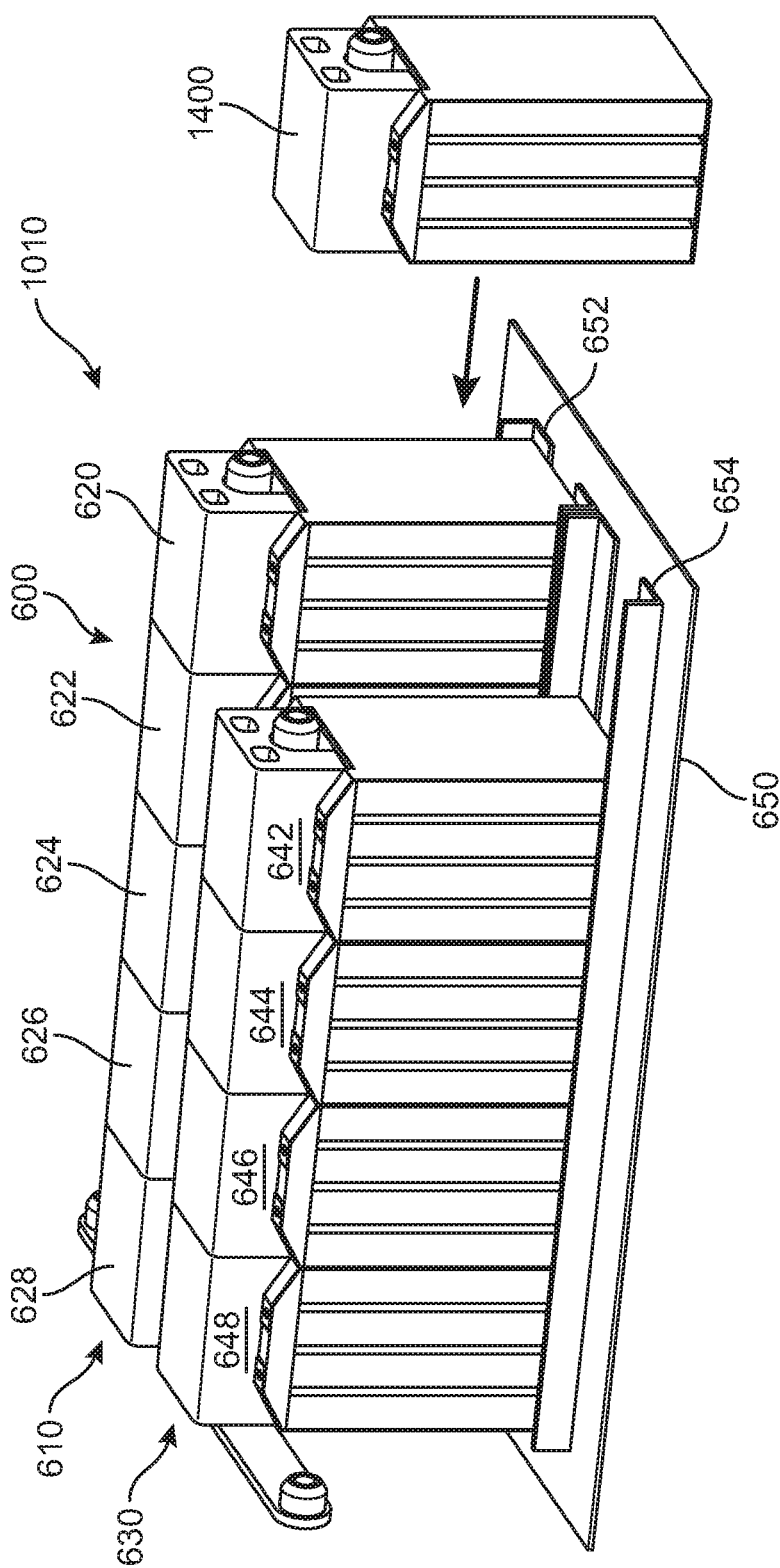
FIG. 14 is a representative view of a step replacing a faulty battery module with a good battery module in a multi-modular battery system.

FIG. 14 illustrates fifth step 1010 of replacing the faulty battery module with a functioning, good battery module. In this embodiment, a replacement battery module 1400 is provided to replace faulty battery module 640. Replacement battery module 1400 may be a new battery module or a refurbished/repaired battery module. In either case, replacement battery module 1400 has been determined to be a functioning and good battery module that is ready to be inserted into multi-modular battery system 600. Second track system 654 may be used to facilitate movement of replacement battery module 1400 by sliding it along second track system 654 towards seventh battery module 642. Replacement battery module 1400 is substantially similar to battery module 100, and includes a conical negative rear terminal that is configured to mate with and engage the conical positive front terminal of seventh battery module 642 to mate replacement battery module 1400 to seventh battery module 642 in second row of modules 630.

Figure 15:
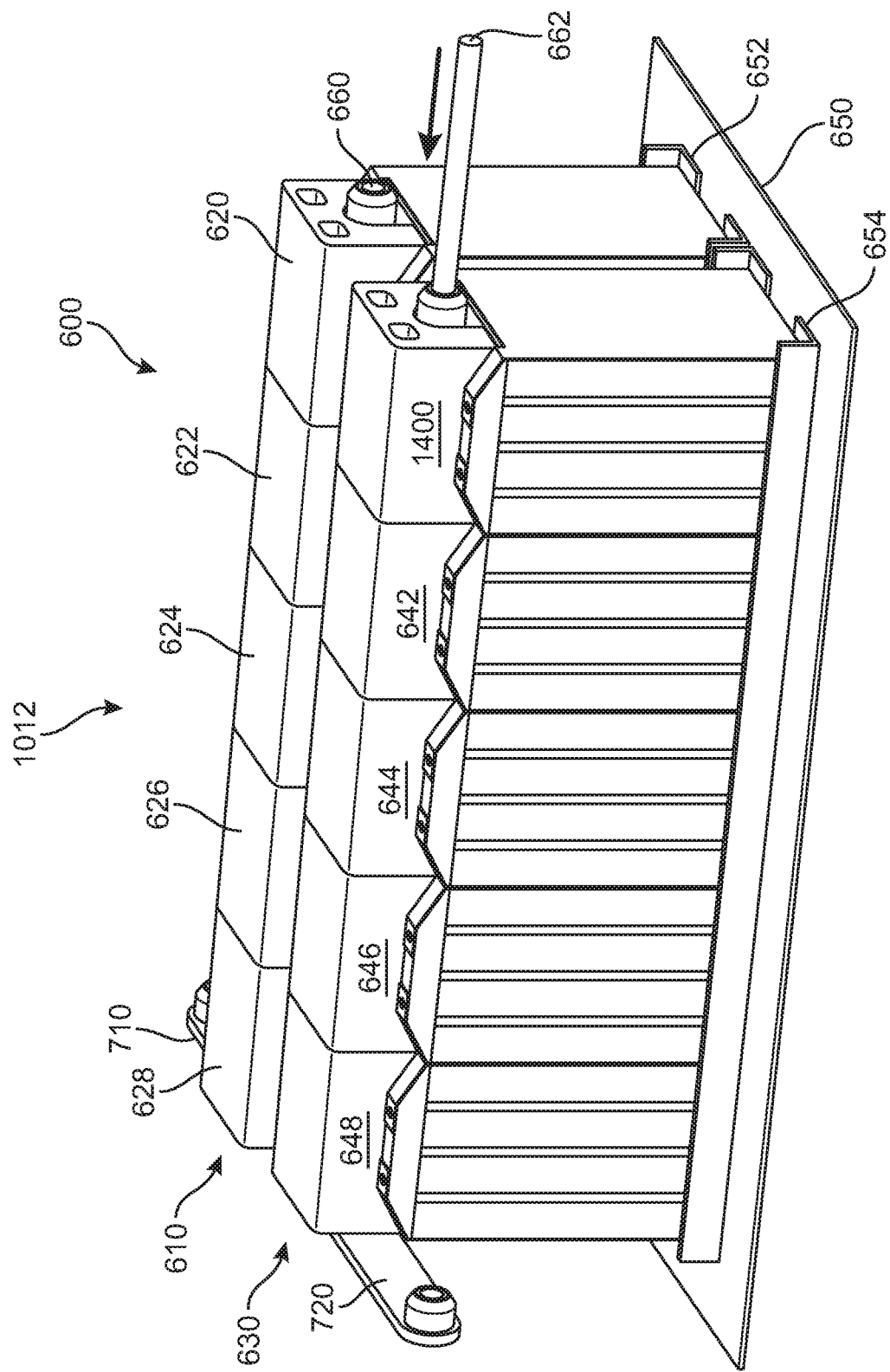
FIG. 15 is a representative view of a step of reconnecting a coupling rod in a multi-modular battery system.
Figure 16:
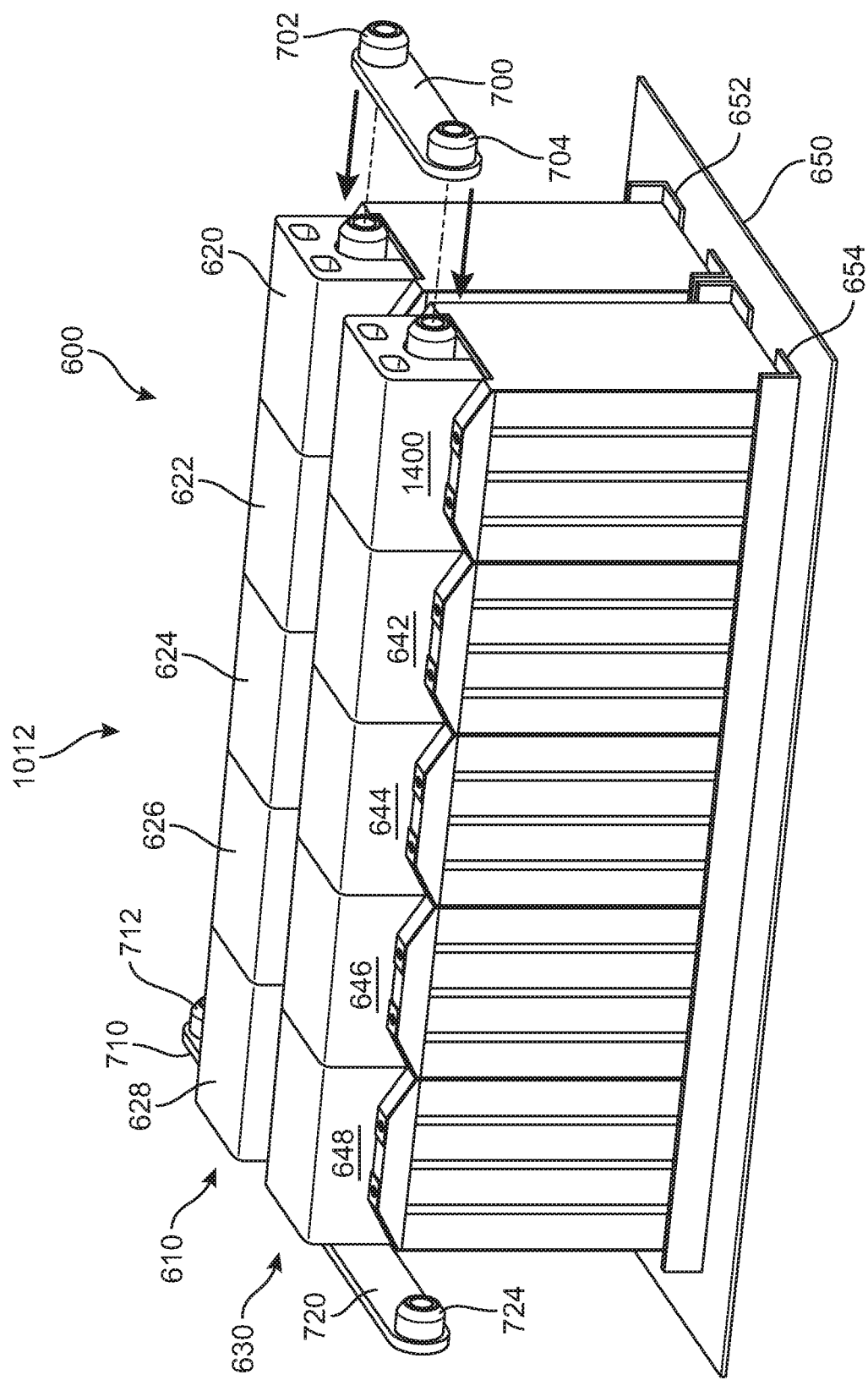
FIG. 16 is a representative view of a step of reconnecting bus bars in a multi-modular battery system.

After replacement battery module 1400 has mated to seventh battery module 642 in second row of modules 630, the remaining components of multi-modular battery system 600 can be reassembled at sixth step 1012 to finish process 1000. Accordingly, FIG. 15 illustrates replacing the coupling rod that was previously removed in third step 1006 and FIG. 16 illustrates replacing the bus bars that were previously removed in second step 1004. As shown in FIG. 15, second coupling rod 662 is re-inserted through the openings in the conical positive front terminals of each battery module in second row of modules 630, including replacement battery module 1400, seventh battery module 642, eighth battery module 644, ninth battery module 646, and tenth battery module 648. Once second coupling rod 662 has been reinserted and refastened, all of the battery modules in second row of modules 630 are electrically coupled to each other. As described above, in this case, because none of the battery modules of first row of modules 610 needed to be replaced, first coupling rod 660 has remained inserted through all of the battery modules in first row of modules 610.

FIG. 16 illustrates the final part of sixth step 1012 of process 1000, where the bus bars are reattached to positive and/or negative terminals of the battery modules. In this embodiment, only first bus bar 700 needed to be removed to access the faulty battery module. Accordingly, in FIG. 16, first bus bar 700 is placed onto the conical positive front terminals of first battery module 620 and replacement battery module 1400. Once completed, multi-modular battery system 600 is once again ready for use.

FIGS. 17 through 23 illustrate optical communication connections between battery modules in the multi-modular battery system according to the present embodiments. In some embodiments, each of the BMS units of individual battery modules may be in optical communication with adjacent BMS units of adjacent battery modules. In one embodiment, BMS units may use optical line-sight-communication to communicate with adjacent BMS units. In an alternate embodiment, BMS units may be connected using fiber optical cables to communicate with adjacent BMS units. In another embodiment, a row of battery modules may be connected to another row of battery modules to provide for communication path redundancies across the entire multi-modular battery system.

Figure 17:
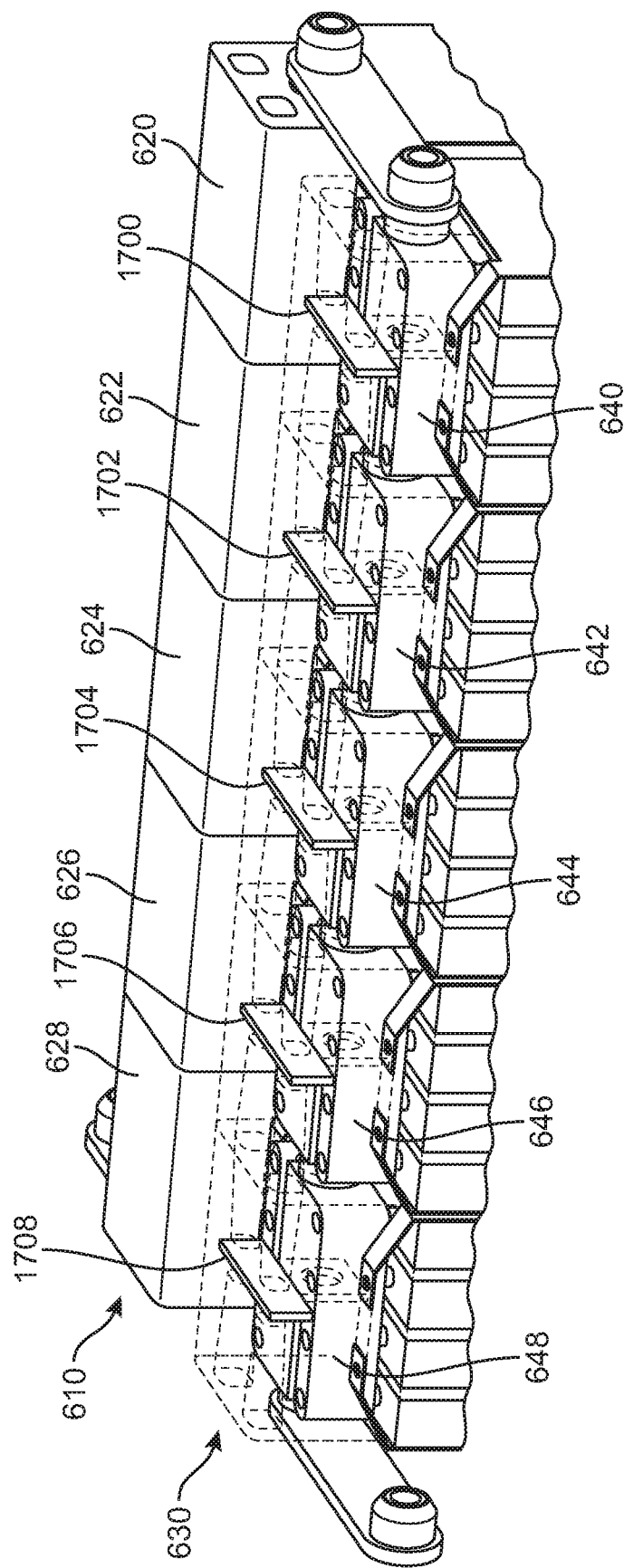
FIG. 17 is a schematic view of an exemplary embodiment of an optical communication system between battery modules in a multi-modular battery system.

Referring now to FIG. 17, the interiors of the head units of the battery modules in second row of modules 630 are illustrated with the associated shrouds in outline to better view the optical communication of the present embodiments. In this embodiment, each of the battery modules in a given row of modules, for example, first row of modules 610 and/or second row of modules 630, are in alignment with each other. Proper alignment of the battery modules in each row of modules may be facilitated by various mechanisms, including, for example, the track systems on platform 650, described above. In this embodiment, the individual battery modules of second row of modules 630 are in alignment with each other by being disposed along second track system 654. This alignment also ensures that respective front optical ports and rear optical ports are aligned between each of the battery modules. Accordingly, as can be seen in FIG. 17, the front and rear optical ports on each of the battery modules in first row of modules 610 and/or second row of modules 630 are in alignment with each other to form an optical communication path between the various BMS units in the battery modules.

Figure 18:
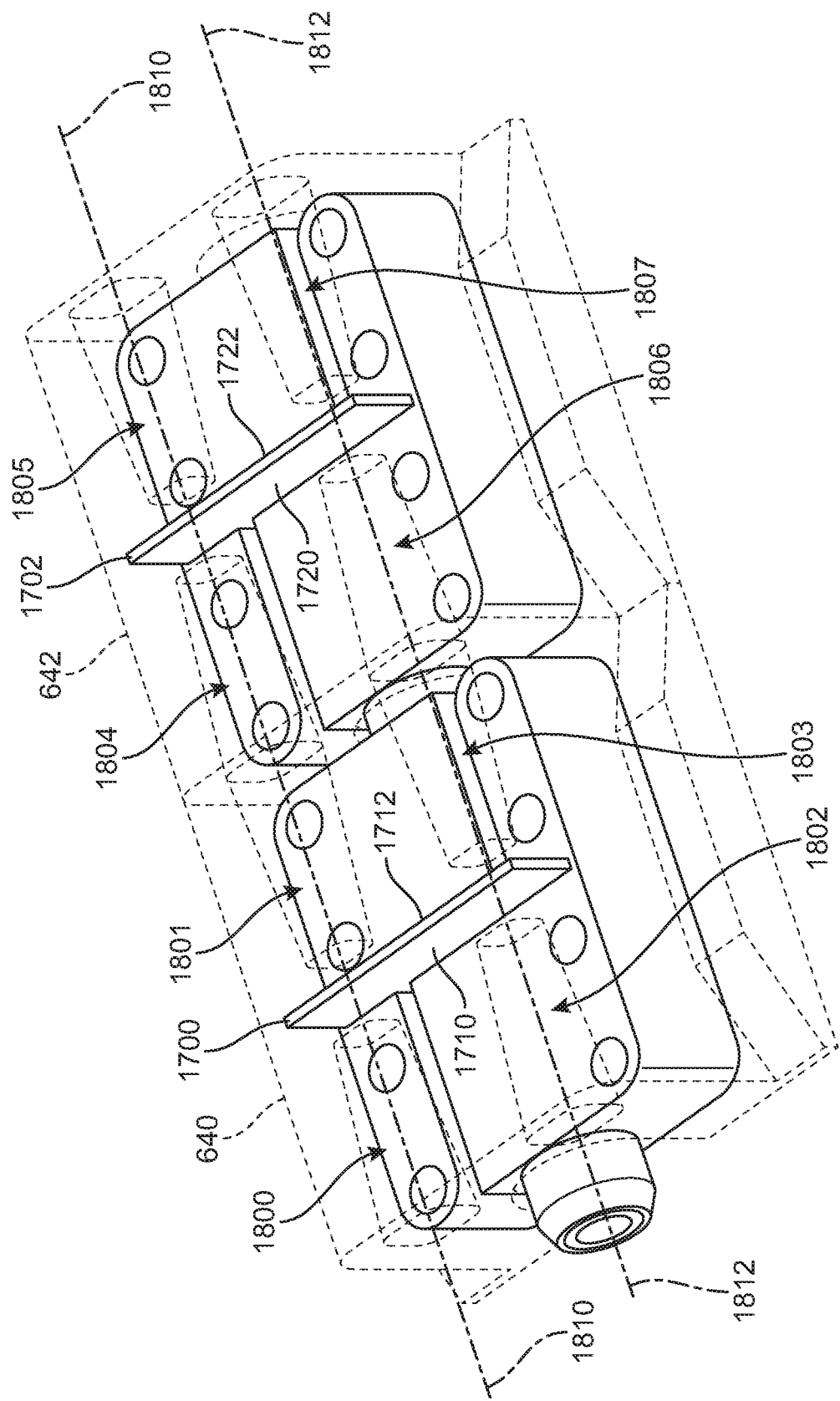
FIG. 18 is an enlarged view of an exemplary embodiment of an optical communication system between battery modules in a multi-modular battery system.

FIG. 18 illustrates a close-up view of the optical communication path between two exemplary battery modules. In this embodiment, the optical communication path between sixth battery module 640 and seventh battery module 642 is shown. In order to better see inside of the head units of sixth battery module 640 and seventh battery module 642, the respective shrouds are shown here in outline. As shown in FIG. 18, sixth battery module 640 and seventh battery module 642 are disposed adjacent to each other and in alignment such that the respective rear optical ports of sixth battery module 640 are aligned with the front optical ports of seventh battery module 642.

In this embodiment, the front optical ports of sixth battery module 640 include a first tapered recess 1800 and a second tapered recess 1802 that extend through the front of the head unit to BMS 1700. The ends of first tapered recess 1800 and second tapered recess 1802 terminate at or near a first side 1710 of BMS 1700, where an optical transmitter and/or receiver can be located for optical communication. Similarly, the rear optical ports of sixth battery module 640 include a third tapered recess 1801 and a fourth tapered recess 1803 that extend through the rear of the head unit to BMS 1700. The ends of third tapered recess 1801 and fourth tapered recess 1803 terminate at or near a second side 1712 of BMS 1700, where an optical transmitter and/or receiver can be located for optical communication.

The head unit of seventh battery module 642 has a substantially similar configuration as that described with reference to sixth battery module 640. In this embodiment, the front optical ports of seventh battery module 642 include a first tapered recess 1804 and a second tapered recess 1806 that extend through the front of the head unit to BMS 1702. The ends of first tapered recess 1804 and second tapered recess 1806 terminate at or near a first side 1720 of BMS 1702, where an optical transmitter and/or receiver can be located for optical communication. Similarly, the rear optical ports of seventh battery module 642 include a third tapered recess 1805 and a fourth tapered recess 1807 that extend through the rear of the head unit to BMS 1702. The ends of third tapered recess 1805 and fourth tapered recess 1807 terminate at or near a second side 1722 of BMS 1702, where an optical transmitter and/or receiver can be located for optical communication.

With this arrangement, an optical communication path for line-of-sight optical communication between BMS 1700 of sixth battery module 640 and BMS 1702 of seventh battery module 642 can be provided. For example, a first optical communication path 1810 can extend through first tapered recess 1800 to first side 1710 of BMS 1700 of sixth battery module, from second side 1712 of BMS 1700 through third tapered recess 1801 of sixth battery module 640 and first tapered recess 1804 of seventh battery module 642 to first side 1720 of BMS 1702 of seventh battery module 642. First optical communication path 1810 may then continue in a similar manner from second side 1722 of BMS 1702 through third tapered recess 1805 of seventh battery module 642 into the optical ports of additional battery modules down the entire row of modules. Similarly, a second optical communication path 1812 can extend through second tapered recess 1802 to first side 1710 of BMS 1700 of sixth battery module, from second side 1712 of BMS 1700 through fourth tapered recess 1803 of sixth battery module 640 and second tapered recess 1806 of seventh battery module 642 to first side 1720 of BMS 1702 of seventh battery module 642. Second optical communication path 1812 may then continue in a similar manner from second side 1722 of BMS 1702 through fourth tapered recess 1807 of seventh battery module 642 into the optical ports of additional battery modules down the entire row of modules.

Accordingly, each row of battery modules of a multi-modular battery system can have optical line-of-sight communication paths between the various BMS units of each battery module that are similar to first optical communication path 1810 and/or second optical communication path 1812.

Figure 19:
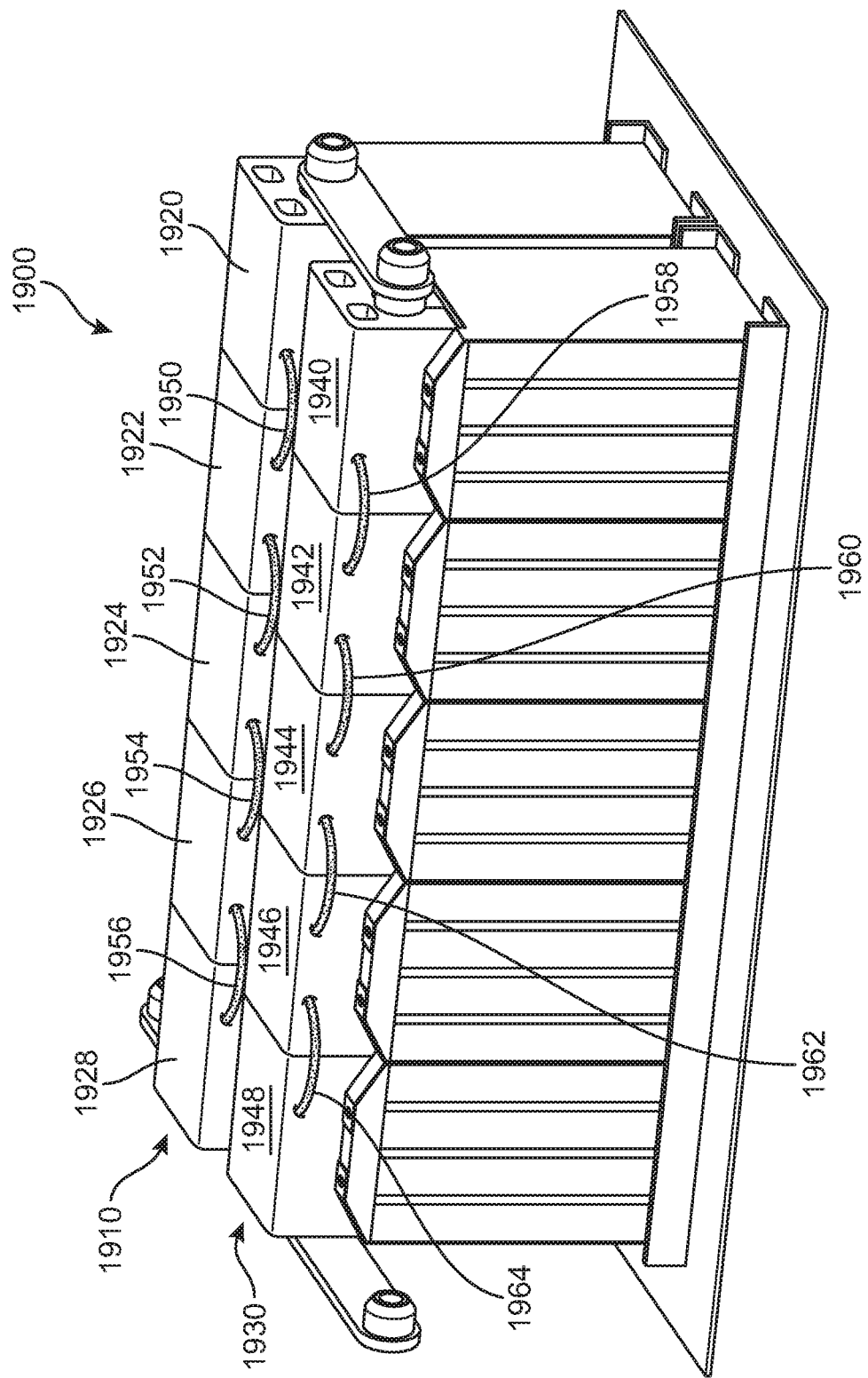
FIG. 19 is a schematic view of an alternate embodiment of an optical communication system between battery modules in a multi-modular battery system.

Alternatively, in some embodiments, optical communication between the various BMS units of the battery modules in a row of battery modules of a multi-modular battery system can be via a wired optical fiber. Referring now to FIG. 19, an alternate embodiment of a multi-modular battery system 1900 is illustrated with an optical communication path provided by fiber optic cable connections between BMS units.

In this embodiment, multi-modular battery system 1900 is substantially similar to multi-modular battery system 600, described above, and includes two rows of five battery modules. First row of modules 1910 includes a first battery module 1920, a second battery module 1922, a third battery module 1924, a fourth battery module 1926, and a fifth battery module 1928. A second row of modules 1930 includes a sixth battery module 1940, a seventh battery module 1942, an eighth battery module 1944, a ninth battery module 1946, and a tenth battery module 1948. Multi-modular battery system 1900 may also include similar components as multi-modular battery system 600, for example, a platform, track systems, bus bars, coupling rods, and other components.

In contrast to the previous embodiments, however, multi-modular battery system 1900 uses a plurality of fiber optic cables to connect the BMS units between adjacent battery modules instead of providing line-of-sight communication paths. As shown in FIG. 19, multi-modular battery system 1900 includes a first cable 1950 connecting the BMS unit of first battery module 1920 and the BMS unit of second battery module 1922. Each adjacent battery module pair includes a similar connection. Accordingly, a second cable 1952 connects the BMS unit of second battery module 1922 and the BMS unit of third battery module 1924, a third cable 1954 connects the BMS unit of third battery module 1924 and the BMS unit of fourth battery module 1926, and a fourth cable 1956 connects the BMS unit of fourth battery module 1926 and the BMS unit of fifth battery module 1928. With the arrangement, each of the BMS units of the battery modules in first row of modules 1910 are connected to the BMS unit of the adjacent battery modules. This configuration allows an optical communication path that can travel through each of the battery modules in first row of modules 1910.

Second row of modules 1930 is similarly arranged with fiber optic cable connections as first row of modules 1910. In this embodiment, multi-modular battery system 1900 includes a fifth cable 1958 connecting the BMS unit of sixth battery module 1940 and the BMS unit of seventh battery module 1942, a sixth cable 1960 connecting the BMS unit of seventh battery module 1942 and the BMS unit of eighth battery module 1944, a seventh cable 1962 connecting the BMS unit of eighth battery module 1944 and the BMS unit of ninth battery module 1946, and an eighth cable 1964 connecting the BMS unit of ninth battery module 1946 and the BMS unit of tenth battery module 1948. With the arrangement, each of the BMS units of the battery modules in second row of modules 1930 are connected to the BMS unit of the adjacent battery modules. This configuration allows an optical communication path that can travel through each of the battery modules in second row of modules 1930.

In some embodiments, optical communication between battery modules may be provided using fiber optic cables or optical line-of-sight communication paths. In other embodiments, battery modules may be configured with both optical ports and connections for fiber optic cables to allow the battery modules to communicate using fiber optic cables, optical line-of-sight communication paths, or a combination of both. For example, in some environments a multi-modular battery system may be better suited to communicate using one of fiber optic cables or optical line-of-sight communication paths. In other environments, having both types of optical communication paths available can provide flexibility in case of failure for additional redundancy.

In addition, in some embodiments, optical communication paths between BMS units of battery modules may also extend between rows of modules in a multi-modular battery system. FIGS. 20 through 23 illustrate comparative examples of communication paths for communications between BMS units of battery modules in a multi-modular battery system having two rows of battery modules.

Figure 20:
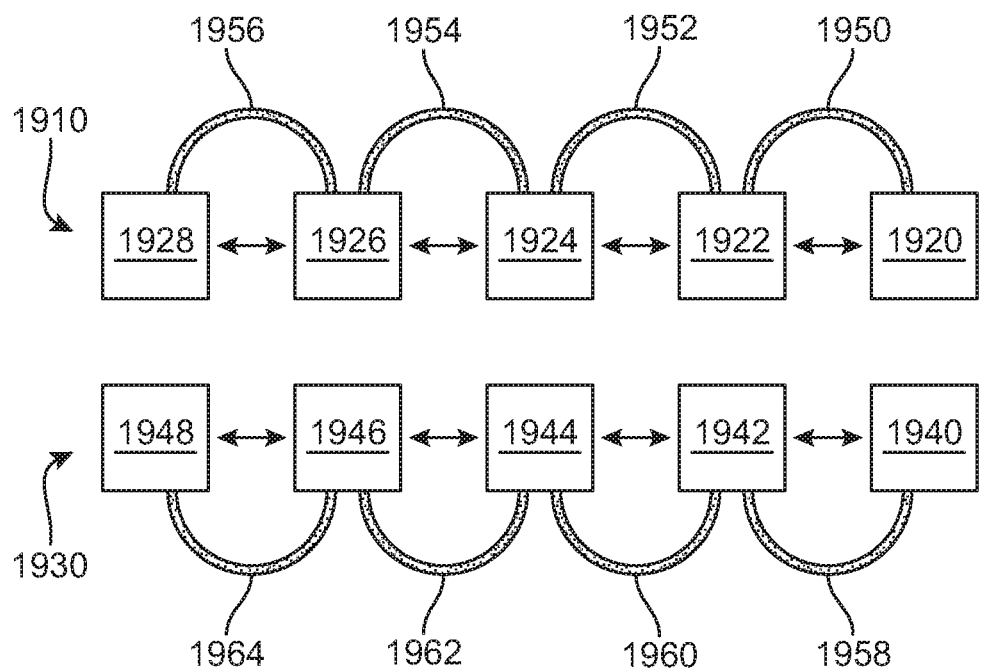
FIG. 20 is a representative view of an exemplary embodiment of an optical communication system between rows of battery modules in a multi-modular battery system.

Referring now to FIG. 20, a schematic representation of the optical communication paths between BMS units of battery modules are shown for multi-modular battery system 1900. In this embodiment, each row of battery modules, including first row of modules 1910 and second row of modules 1930, has an optical communication path that extends along each of the battery modules in the respective row. In other words, the BMS units of the battery modules of first row of modules 1910 can communicate along an optical communication path defined by first cable 1950, second cable 1952, third cable 1954, and fourth cable 1956. Similarly, the BMS units of the battery modules of second row of modules 1930 can communicate along an optical communication path defined by fifth cable 1958, sixth cable 1960, seventh cable 1962, and eighth cable 1964. In this embodiment, the optical communication paths of first row of modules 1910 and second row of modules 1930 are separate. As a result, the BMS units of the battery modules in first row of modules 1910 do not share an optical communication path with the BMS units of the battery modules in second row of modules 1930.

Figure 21:
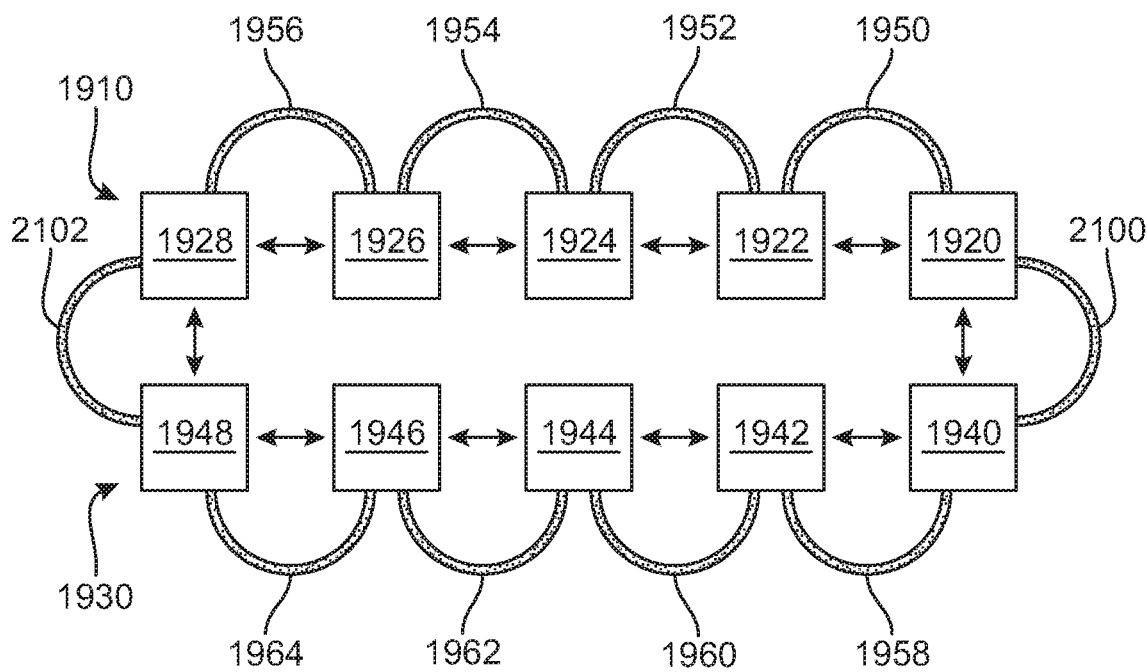
FIG. 21 is a representative view of an exemplary embodiment of an optical communication system connecting two rows of battery modules in a multi-modular battery system.

In an alternate embodiment, the BMS units of the battery modules disposed at the ends of each row of modules may also be linked to each other to continue and link the optical communication path between adjacent rows of modules. FIG. 21 illustrates an alternate embodiment of multi-modular battery system 1900 with additional fiber optical cables connecting the battery modules on the end of each row of modules. In this embodiment, a ninth cable 2100 extends between the BMS unit of first battery module 1920 in first row of modules 1910 and the BMS unit of sixth battery module 1940 in second row of modules 1930. Similarly, a tenth cable 2102 may also extend between the BMS unit of fifth battery module 1928 in first row of modules 1910 and the BMS unit of tenth battery module 1948 in second row of modules 1930. With this configuration, the BMS units of the battery modules in first row of modules 1910 can share a common optical communication path with the BMS units of the battery modules in second row of modules 1930. Accordingly, multi-modular battery system 1900 can have a single optical communication path that extends through each of the BMS units in all of the rows of modules.

By providing a common optical communication path between the rows of modules that form the multi-modular battery system, signals between various BMS units of the battery modules can be re-routed to follow an alternate communication path in the event of a faulty battery module. For example, FIG. 22 illustrates a scenario in which multi-modular battery system 1900 has a faulty battery module in one row of modules without a shared optical communication path between rows of modules.

Figure 22:
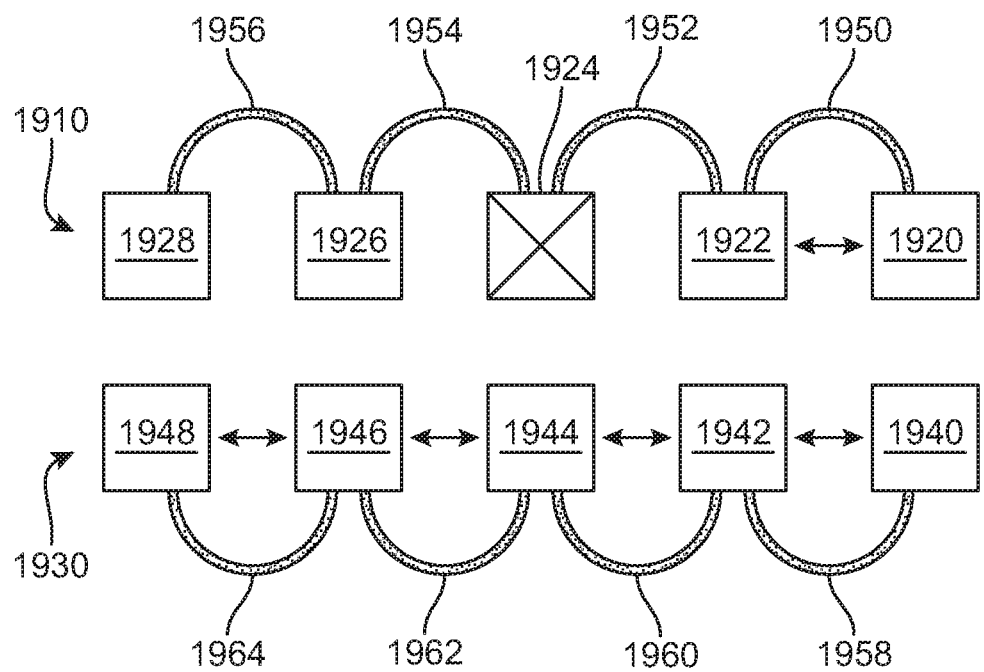
FIG. 22 is a representative view of an exemplary embodiment of an optical communication system between rows of battery modules in a multi-modular battery system with a faulty communication module.

As shown in FIG. 22, if third battery module 1924 in first row of modules 1910 is faulty, then the optical communication path extending between the BMS units of the battery modules in first row 1910 may be interrupted. For example, in FIG. 22, if third battery module 1924 is faulty, then the optical communication path from the BMS unit of third battery module 1924 to fourth battery module 1926 along third cable 1954 and to fifth battery module 1928 along fourth cable 1956 may be interrupted by the failure at third battery module 1924. As a result, a signal that needs to travel along the optical communication path from first battery module 1920 to fourth battery module 1926 and/or fifth battery module 1928 may be interrupted by the failure of third battery module 1924.

Figure 23:
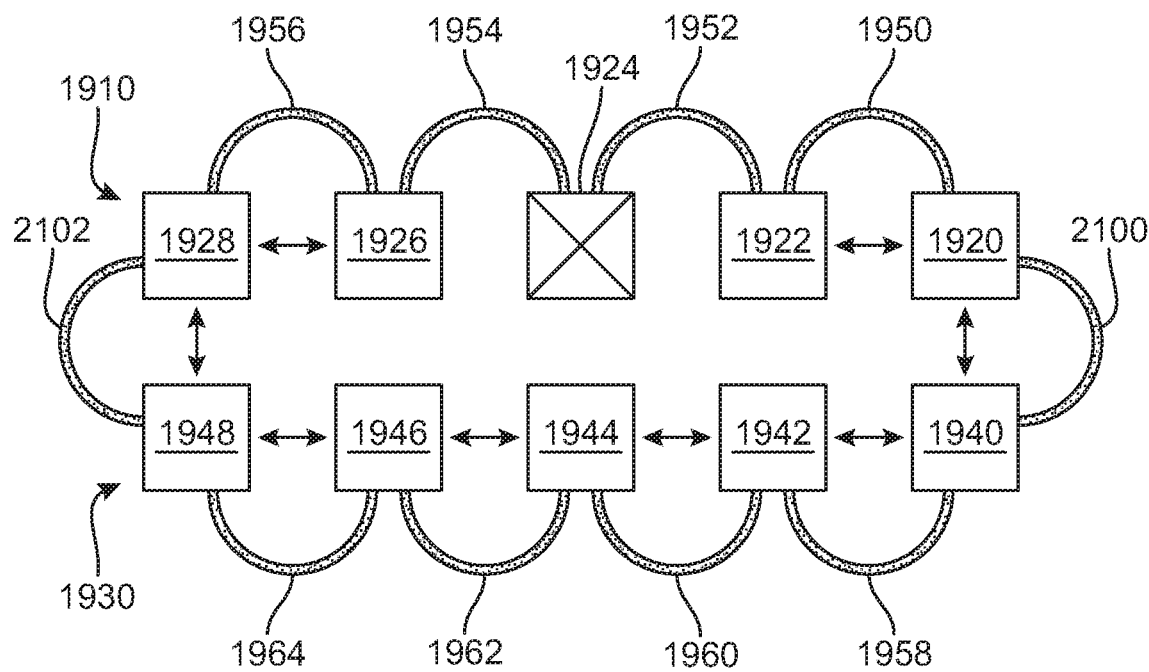
FIG. 23 is a representative view of an exemplary embodiment of an optical communication system connecting two rows of battery modules in a multi-modular battery system with a faulty communication module.

FIG. 23 illustrates the same scenario as FIG. 22 in which multi-modular battery system 1900 has a faulty battery module in one row of modules, however, in this alternate embodiment of multi-modular battery system 1900, additional fiber optical cables connect the battery modules on the end of each row of modules. As shown in FIG. 23, if third battery module 1924 in first row of modules 1910 is faulty, then the direct optical communication path extending between the BMS units of the battery modules in first row 1910 may be interrupted, as described above with regard to the scenario shown in FIG. 22. However, with the alternate embodiment of multi-modular battery system 1900 having connected rows, if third battery module 1924 is faulty, then an alternate optical communication path can be provided.

For example, while direct optical communication from second battery module 1922 to the third battery module 1924 along second cable 1952 may also prevent direct optical communication from third battery module 1924 to fourth battery module 1926 along third cable 1954 and/or to fifth battery module 1928 along fourth cable 1956, an alternate optical communication path can be provided using ninth cable 2100 and/or tenth cable 2102 that connect the battery modules disposed at the ends of first row of modules 1910 and second row of modules 1930. As a result, a signal that needs to travel along an optical communication path from first battery module 1920 to fourth battery module 1926 and/or fifth battery module 1928 can instead be routed along an alternate optical communication path from first battery module 1920 of first row 1910 to sixth battery module 1940 of second row 1930 along ninth cable 2100. From sixth battery module 1940, the signal may then proceed along cables connecting each of the battery modules in second row of modules 1930 to tenth battery module 1948 at the end of second row 1930. At tenth battery module 1948, the signal may then proceed back from second row of modules 1930 to fifth battery module 1928 of first row of modules 1910 along tenth cable 2102 and/or from fifth battery module 1928 further to fourth battery module 1926 along fourth cable 1956. With this arrangement, the optical communication path that would otherwise be interrupted by the failure of third battery module 1924 as depicted in the scenario of FIG. 22 can instead be re-routed along the alternate optical communication path as depicted in the scenario of FIG. 23. Therefore, the alternate embodiment of multi-modular battery system 1900 having connected rows of modules provides additional redundancies in the case of battery module failure and allows for optical communication path re-routing.

In addition to the claimed system, a method of replacing a battery module in a multi-modular battery system is also contemplated to be within the scope of the invention as renumerated in paragraphs A-F, as follows:

A. A method of replacing a battery module in a multi-modular battery system; the method comprising:

providing a multi-modular battery system comprising a plurality of battery modules, wherein at least two battery modules of the plurality of battery modules are coupled together in an end-to-end relationship by mating a conical positive terminal of one battery module with a conical negative terminal of another battery module; and removing a battery module from the plurality of battery modules by uncoupling the conical negative terminal of the battery module from a conical positive terminal of an adjacent battery module.

B. The method according to claim A, further comprising electrically uncoupling the plurality of battery modules by removing a coupling rod extending through openings disposed in the conical positive terminal and the conical negative terminal of the battery modules.

C. The method according to claim A, wherein the multi-modular battery system comprises at least a first row of battery modules and a second row of battery modules;

the method further comprising electrically uncoupling the first row of battery modules from the second row of battery modules by removing at least one bus bar connected to at least one battery module of the first row of battery modules and at least one battery module of the second row of battery modules.

D. The method according to claim A, wherein the multi-modular battery system comprises a platform having at least one track system for the plurality of battery modules;

the method further comprising sliding at least one battery module along the at least one track system to remove the at least one battery module from the multi-modular battery system.

E. The method according to claim D, further comprising sliding at least one replacement battery along the at least one track system to mate with a conical positive terminal of another battery module.

F. The method according to claim E, further comprising inserting a coupling rod through openings disposed in the conical positive terminal and the conical negative terminal of the battery modules.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A battery module comprising:
a plurality of battery cells;
a positive terminal coupler connecting positive terminal posts of the plurality of battery cells;
a negative terminal coupler connecting negative terminal posts of the plurality of battery cells;
wherein the positive terminal coupler includes a conical positive terminal disposed on a front side of the battery module;
wherein the negative terminal coupler includes a conical negative terminal disposed on a rear side of the battery module.

2. The battery module according to claim 1, wherein the conical positive terminal has a generally concave shape that extends away from the front side of the battery module.

3. The battery module according to claim 2, wherein the conical negative terminal has a generally convex shape that defines a recess extending into the rear side of the battery module.

4. The battery module according to claim 3, wherein the conical positive terminal and the conical negative terminal are configured to mate with each other.

5. The battery module according to claim 1, wherein the conical positive terminal of the battery module is configured to mate with a conical negative terminal disposed on another battery module to couple the battery modules together.

6. The battery module according to claim 1, wherein the conical negative terminal of the battery module is configured to receive a conical positive terminal disposed on another battery module to couple the battery modules together.

7. The battery module according to claim 1, wherein the positive terminal coupler and the negative terminal coupler are disposed on top of the plurality of battery cells in an opposing relationship.

8. The battery module according to claim 7, wherein the conical positive terminal includes an opening disposed approximately in a center of the positive terminal coupler on the front side of the battery module;
wherein the conical positive terminal includes an opening disposed approximately in a center of the negative terminal coupler on the rear side of the battery module; and
wherein the opening of the conical positive terminal is aligned with the opening of the conical negative terminal.

9. The battery module according to claim 7, further comprising a battery maintenance system (BMS) disposed between the positive terminal coupler and the negative terminal coupler.

10. A multi-modular battery system comprising:
a plurality of battery modules;
wherein each battery module of the plurality of battery modules comprises a plurality of battery cells, a positive terminal coupler connecting positive terminal posts of the plurality of battery cells, a negative terminal coupler connecting negative terminal posts of the plurality of battery cells, wherein the positive terminal coupler includes a conical positive terminal disposed on a front side of the battery module, and wherein the negative terminal coupler includes a conical negative terminal disposed on a rear side of the battery module; and
wherein at least two battery modules of the plurality of battery modules are coupled together in an end-to-end relationship by mating a conical positive terminal of one battery module with a conical negative terminal of another battery module.

11. The multi-modular battery system according to claim 10, further comprising at least two rows of battery modules, wherein each row comprises at least two battery modules coupled together in an end-to-end relationship by mating a conical positive terminal of one battery module with a conical negative terminal of another battery module.

12. The multi-modular battery system according to claim 10, further comprising a platform including at least one track system; and
wherein the plurality of battery modules are configured to be moved by sliding along the at least one track system.

13. The multi-modular battery system according to claim 10, wherein the conical positive terminal includes an opening disposed approximately in a center of the positive terminal coupler on the front side of the battery module;
wherein the conical positive terminal includes an opening disposed approximately in a center of the negative terminal coupler on the rear side of the battery module; and
wherein the opening of the conical positive terminal is aligned with the opening of the conical negative terminal.

14. The multi-modular battery system according to claim 13, further comprising at least one coupling rod; and wherein the plurality of battery modules are electrically coupled together by inserting the at least one coupling rod through the openings disposed in the conical positive terminal and the conical negative terminal of the battery modules.

15. The multi-modular battery system according to claim 10, further comprising a first row of battery modules and a second row of battery modules;
wherein the first row of battery modules comprises at least two battery modules coupled together in an end-to-end relationship by mating a conical positive terminal of one battery module with a conical negative terminal of another battery module;
wherein the second row of battery modules comprises at least two battery modules coupled together in an end-to-end relationship by mating a conical positive terminal of one battery module with a conical negative terminal of another battery module;
wherein the at least two battery modules of the first row of battery modules are electrically coupled together with a coupling rod inserted through openings disposed in the conical positive terminal and the conical negative terminal of the battery modules; and
wherein the at least two battery modules of the second row of battery modules are electrically coupled together with a coupling rod inserted through openings disposed in the conical positive terminal and the conical negative terminal of the battery modules.

16. The multi-modular battery system according to claim 15, further comprising at least one bus bar; and
wherein the at least one bus bar electrically couples at least one battery module in the first row of battery modules with at least one battery module in the second row of battery modules.

17. The multi-modular battery system according to claim 16, wherein the at least one bus bar includes a first bus bar that couples the conical positive terminal of the at least one battery module in the first row of battery modules with the conical positive terminal of the at least one battery module in the second row of battery modules.

18. The multi-modular battery system according to claim 15, further comprising a platform including a first track system and a second track system;
wherein the first row of battery modules are disposed along the first track system; and
wherein the second row of battery modules are disposed along the second track system.

19. The multi-modular battery system according to claim 10, wherein each battery module of the plurality of battery modules further comprises a head unit disposed on top of the plurality of battery cells, the head unit including the positive terminal coupler and the negative terminal coupler; and
wherein the head unit includes a battery maintenance system (BMS) disposed between the positive terminal coupler and the negative terminal coupler.

20. The multi-modular battery system according to claim 19, wherein the head unit includes at least one optical port disposed on the front side of the battery module and at least one optical port disposed on the rear side of the battery module.

21. The multi-modular battery system according to claim 20, wherein the at least one optical port disposed on the front side of the battery module and the at least one optical port disposed on the rear side of the battery module include a tapered recess that terminates near the BMS.

22. The multi-modular battery system according to claim 20, wherein at least one optical port disposed on the front side of one of the battery modules in the plurality of battery modules is aligned with at least one optical port disposed on the rear side of another one of the battery modules in the plurality of battery modules.

23. The multi-modular battery system according to claim 22, wherein the BMS of at least two battery modules are in optical line-of-sight communication with each other through the aligned optical ports.

24. The multi-modular battery system according to claim 19, wherein a head unit of at least one of the battery modules in the plurality of battery modules is connected by a fiber optical cable to at least another one of the battery modules in the plurality of battery modules.

25. The multi-modular battery system according to claim 19, wherein head units of the battery modules in the plurality of battery modules are connected by an optical communication path.

26. The multi-modular battery system according to claim 25, wherein the optical communication path comprises at least one of an optical line-of-sight communication path and a fiber optic cable.

27. The multi-modular battery system according to claim 10, further comprising at least two rows of battery modules; and
wherein a head unit of at least one battery module in a first row of battery modules is connected by an optical communication path to a head unit of at least one battery module in a second row of battery modules.

28. The multi-modular battery system according to claim 27, wherein optical communication between the battery modules in the first row of battery modules can be re-routed through at least one battery module in the second row of battery modules in the case of a failure of a battery module in the first row of battery modules.

29. The multi-modular battery system according to claim 27, wherein the optical communication path is a fiber optic cable that connects a head unit of one battery module disposed at an end of the first row of battery modules with a head unit of one battery module disposed at an end of the second row of battery modules.

* * * * *